(12) United States Patent
van Os et al.

(10) Patent No.: US 9,631,942 B2
(45) Date of Patent: *Apr. 25, 2017

(54) PROVIDING MANEUVER INDICATORS ON A MAP

(71) Applicant: Apple Inc., Cupertino, CA (US)

(72) Inventors: Marcel van Os, San Francisco, CA (US); Cédric Bray, Sunnyvale, CA (US); Yaohua Hu, Mountain View, CA (US); Elisabeth Lindkvist, Sunnyvale, CA (US); Adrian Lindberg, Santa Clara, CA (US); Christine B. McGavran, Pacifica, CA (US); Billy P. Chen, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,347

(22) Filed: Oct. 5, 2016

(65) Prior Publication Data

US 2017/0023375 A1    Jan. 26, 2017

Related U.S. Application Data

(63) Continuation of application No. 14/081,950, filed on Nov. 15, 2013.

(Continued)

(51) Int. Cl.
*G01C 22/00* (2006.01)
*G05D 1/00* (2006.01)
(Continued)

(52) U.S. Cl.
CPC ..... *G01C 21/3632* (2013.01); *G01C 21/3664* (2013.01); *G01C 21/3676* (2013.01)

(58) Field of Classification Search
CPC ....... G08G 1/096872; G08G 1/096827; G08G 1/0969; G08G 1/096861; G01C 21/3629
(Continued)

(56) References Cited

U.S. PATENT DOCUMENTS 4,914,605 A   4/1990 Loughmiller, Jr. et al.
5,459,667 A   10/1995 Odagaki et al.
(Continued)

FOREIGN PATENT DOCUMENTS

DE    102008036748    10/2009
EP         1626250     2/2006
(Continued)

OTHER PUBLICATIONS

Author Unknown, "Blaupunkt chooses NNG navigation software for new aftermarket product," May 24, 2011, 2 pages, available at http://telematicsnews.info/2011/05/24/blaupunkt-chooses-nng-navigation-software-for-new-aftermarket-product_my2241/.

(Continued)

*Primary Examiner* — Maceeh Anwari
(74) *Attorney, Agent, or Firm* — Gianni Minutoli; Page Ponsford; DLA Piper LLP US

(57) ABSTRACT

For a device that runs a mapping application, a method for providing maneuver indicators along a route of a map. The maneuver indicators are arrows that identify the direction and orientation of a maneuver. A maneuver arrow may be selected and displayed differently from unselected maneuver arrows. Maneuver arrows may be selected automatically based on a user's current location. The mapping application transitions between maneuver arrows and provides an animation for the transition. Complex maneuvers may be indicated by multiple arrows, providing a more detailed guidance for a user of the mapping application.

20 Claims, 16 Drawing Sheets

Related U.S. Application Data

(60) Provisional application No. 61/832,910, filed on Jun. 9, 2013.

(51) Int. Cl.
  G01M 17/00 (2006.01)
  G06F 7/00 (2006.01)
  G06F 19/00 (2011.01)
  G01C 21/36 (2006.01)

(58) Field of Classification Search
  USPC .................................................. 701/428, 431
  See application file for complete search history.

(56) References Cited

U.S. PATENT DOCUMENTS

| | | |
|---|---|---|
| 5,629,854 A | 5/1997 | Schulte |
| 5,654,892 A | 8/1997 | Fujii et al. |
| 6,321,158 B1 | 11/2001 | DeLorme et al. |
| 6,363,322 B1 | 3/2002 | Millington |
| 6,693,564 B2 | 2/2004 | Niitsuma |
| 7,480,565 B2 | 1/2009 | Ikeuchi et al. |
| 7,698,063 B2 | 4/2010 | Kim |
| 7,729,854 B2 | 6/2010 | Muramatsu |
| 8,355,862 B2 | 1/2013 | Matas et al. |
| 8,428,871 B1 | 4/2013 | Matthews et al. |
| 8,464,182 B2 | 6/2013 | Blumenberg et al. |
| 8,589,075 B1 | 11/2013 | Jones |
| 8,606,516 B2 | 12/2013 | Vertelney et al. |
| 8,607,167 B2 | 12/2013 | Matas et al. |
| 8,612,151 B2 | 12/2013 | Winkler et al. |
| 8,639,654 B2 | 1/2014 | Vervaet et al. |
| 2004/0024524 A1 | 2/2004 | Miyazawa |
| 2005/0049786 A1 | 3/2005 | Odachi et al. |
| 2005/0273251 A1 | 12/2005 | Nix et al. |
| 2005/0273252 A1 | 12/2005 | Nix et al. |
| 2006/0041372 A1 | 2/2006 | Kubota et al. |
| 2006/0195257 A1 | 8/2006 | Nakamura |
| 2006/0217879 A1 | 9/2006 | Ikeuchi et al. |
| 2007/0150179 A1 | 6/2007 | Pinkus et al. |
| 2007/0276597 A1 | 11/2007 | Kato et al. |
| 2008/0208450 A1 | 8/2008 | Katzer |
| 2008/0228393 A1 | 9/2008 | Geelen et al. |
| 2009/0037094 A1 | 2/2009 | Schmidt |
| 2009/0063041 A1 | 3/2009 | Hirose et al. |
| 2009/0171561 A1 | 7/2009 | Geelen |
| 2009/0171575 A1 | 7/2009 | Kim et al. |
| 2009/0171578 A1 | 7/2009 | Kim et al. |
| 2009/0182497 A1 | 7/2009 | Hagiwara |
| 2009/0187335 A1 | 7/2009 | Muhlfelder et al. |
| 2009/0216434 A1 | 8/2009 | Panganiban et al. |
| 2009/0326803 A1 | 12/2009 | Neef et al. |
| 2010/0045704 A1 | 2/2010 | Kim |
| 2010/0153010 A1 | 6/2010 | Huang |
| 2010/0309149 A1 | 12/2010 | Blumenberg et al. |
| 2010/0324816 A1 | 12/2010 | Highstrom et al. |
| 2011/0098918 A1 | 4/2011 | Sillski et al. |
| 2011/0167058 A1 | 7/2011 | van Os |
| 2011/0285717 A1 | 11/2011 | Schmidt et al. |
| 2012/0041674 A1 | 2/2012 | Katzer |
| 2012/0143504 A1 | 6/2012 | Kalai et al. |
| 2012/0265433 A1 | 10/2012 | Viola et al. |
| 2012/0303263 A1 | 11/2012 | Alam et al. |
| 2012/0303268 A1 | 11/2012 | Su et al. |
| 2012/0303274 A1 | 11/2012 | Su et al. |
| 2013/0191020 A1 | 7/2013 | Emani et al. |
| 2013/0325339 A1 | 12/2013 | McCarthy |
| 2013/0325342 A1 | 12/2013 | Pylappan et al. |
| 2013/0328861 A1 | 12/2013 | Arikan et al. |
| 2013/0328915 A1 | 12/2013 | Arikan et al. |
| 2013/0328916 A1 | 12/2013 | Arikan et al. |
| 2013/0328924 A1 | 12/2013 | Arikan et al. |
| 2014/0365114 A1 | 12/2014 | van Os et al. |

FOREIGN PATENT DOCUMENTS

| | | |
|---|---|---|
| EP | 2080985 | 7/2009 |
| EP | 2672223 | 12/2013 |
| EP | 2672225 | 12/2013 |
| EP | 2672226 | 12/2013 |
| WO | WO 86/02764 | 5/1986 |
| WO | WO 2007/101711 | 9/2007 |
| WO | WO 2011/076989 | 6/2011 |
| WO | WO 2011/146141 | 11/2011 |
| WO | WO 2012/034581 | 3/2012 |
| WO | WO 2013/184348 | 12/2013 |
| WO | WO 2013/184444 | 12/2013 |
| WO | WO 2013/184449 | 12/2013 |
| WO | WO 2013/184450 | 12/2013 |

OTHER PUBLICATIONS

Author Unknown, "'Touch & Go' Owner's Manual," Jul. 2011, 218 pages, Toyota, United Kingdom.

Author Unknown, "Android 2.3.4 User's Guide", May 20, 2011, pp. 1-384, Google, Inc.

Author Unknown, "GARMIN. nüvi 1100/1200/1300/1400 series owner's manual," Jan. 2011, 72 pages, Garmin Corporation, No. 68, Jangshu 2nd Road, Sijhih, Taipei County, Taiwan.

Author Unknown, "Google Maps Voice Navigation in Singapore," software2tech, Jul. 20, 2011, 1 page, available at http://www.youtube.com/watch?v=7BPJN7BkvME.

Lawrence, Steve, "Review: Sygic Mobile Maps 2009," Jul. 23, 2009, 4 pages, available at http://www.iphonewzealand.co.nz/2009/all/review-sygic-mobile-maps-2009/.

Ruhs, Chris, "My Favorite Android Apps: Maps," Jun. 24, 2011, 1 page, available at http://www.youtube.com/watch?v=v2aRkLkLT3s.

PROVIDING MANEUVER INDICATORS ON A MAP

CLAIM OF BENEFIT TO PRIOR APPLICATIONS

This application is a continuation application of U.S. patent application Ser. No. 14/081,950, entitled "Providing Maneuver Indicators on a Map," filed Nov. 15, 2013, now published as United States Patent Publication 2014/0365114. U.S. patent application Ser. No. 14/081,950 claims the benefit of U.S. Provisional Patent Application 61/832,910, filed Jun. 9, 2013. U.S. patent application Ser. No. 14/081,950 and U.S. Provisional Patent Application 61/832,910 are incorporated herein by reference.

BACKGROUND

Mapping applications provide users with a map of a location. Mapping applications can be used to provide routes and directions for a user between different locations. With the proliferation of mobile devices, such as smartphones, mapping applications have increased in popularity. Despite their popularity, the shortcomings of these mapping applications are inconvenient when providing routes and directions to the users. For instance, in providing directions along a route between two locations, these mapping applications do not provide sufficient visual information about maneuvers.

BRIEF SUMMARY

Some embodiments of the invention provide a mapping application that displays maneuver indicators along a route of a map. In some embodiments, the maneuver indicators are arrows that identify the direction and orientation of the maneuvers. A maneuver arrow in some embodiments is a visual representation of a maneuver along a route. The placement of such an arrow along the route at the location of the maneuver greatly augments the user's understanding of the maneuver as it describes the maneuver in a simple visual format. In some embodiments, the maneuver indicators (e.g., maneuver arrows) are only presented at the location of a maneuver and do not cover the entire route. Such maneuver indicators are highly useful when a complex set of maneuvers have to be sequentially performed in an area of the map that is congested with multiple roads and/or intersections.

In some embodiments, different maneuver indicators along the route are displayed differently. For example, in some embodiments, each maneuver indicator is a selectable item in a graphical user interface (GUI) of the mapping application. In some of these embodiments, the current or selected maneuver indicator has a different appearance (e.g., has a different color or highlight) than the other maneuver indicators. Also, some embodiments allow the map to be displayed at multiple different zoom levels and only display the maneuver indicators at certain zoom levels.

The mapping application of some embodiments displays the maneuver indicators along the route in conjunction with maneuver instructions that it provides to one side of the route (e.g., on top or to the left/right of the route). Such maneuver instructions provide additional instructions or hints to a user regarding a maneuver along the route. For example, a maneuver instruction may instruct a user to turn right at an intersection, keep to the left at a fork in the road, etc. In some embodiments, each maneuver instruction is a banner that includes both instructional text that describes the maneuver in writing, and instructional arrows that display the maneuver pictorially.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a mapping application that displays maneuver indicators along a route of a map. In some embodiments, the maneuver indicators are uni-directional arrows that are placed on a route at the location of different maneuvers in order to identify the direction and orientation of the maneuvers. Such arrows are only presented at the location of the maneuvers and do not cover the entire route.

In some embodiments, the mapping application displays the maneuver indicators along the route in conjunction with maneuver instructions that it provides to one side of the route (e.g., on top or to the left/right of the route). Such maneuver instructions provide additional instructions or hints to a user regarding a maneuver along the route. In some embodiments, each maneuver instruction is a banner that includes both instructional text that describes the maneuver in writing, and instructional arrows that display the maneuver pictorially.

Figure 1:
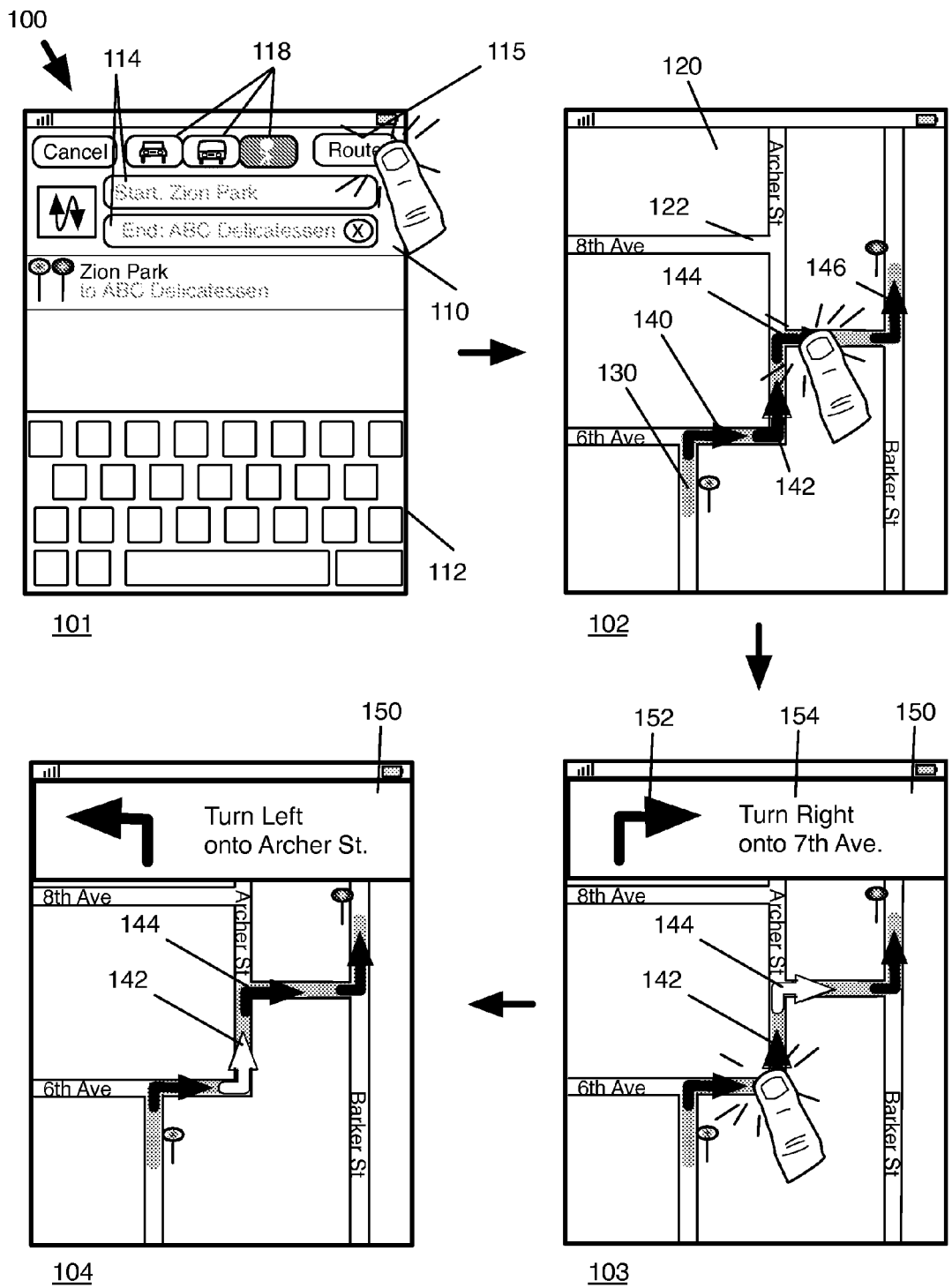
FIG. 1 illustrates an example a mapping application with maneuver arrows.

FIG. 1 illustrates an example of a mapping application of some embodiments that uses such maneuver arrows and maneuver instructions. The mapping application in this example and many examples provided below executes on a mobile device (e.g., smartphone) that has a touch-sensitive screen. The user interactions in this example, as well as many of the interactions for the examples described below, are touch interactions that are enabled by the touch-sensitive screen. However, one of ordinary skill will realize that these interactions can be performed through other input mechanisms, such as cursor controllers, voice commands, non-touch gesture commands, etc.

FIG. 1 illustrates this example in terms of four operational stages 101-104 of the graphical user interface (GUI) 100 of the mapping application. The first stage 101 shows a page 110 of the GUI 100 through which a user can specify start and destination locations for a route. The user can specify these two locations in the start and end fields 114 by using an on-screen keyboard 112. For the route, the user can also specify a mode of travel through the travel method selectors 118, which in this example includes driving, public transit and walking. In this example, walking has been selected, as shown by the highlighted image of the pedestrian walking icon. The first stage 101 shows the user touch selecting the route button 115 to calculate a walking route between the locations input in the text input areas 114 (which in this example are Zion Park and ABC Delicatessen).

The second stage 102 shows that the GUI 100 displays a map 120 with a route 130 between the specified start and end locations (i.e., between the park and the deli) after the user has selected route button 115. The map 120 includes roads 122, and the route 130 is placed over the portion of the roads that leads from the park to the deli in this example. The map 120 displays four maneuver arrows 140-146 over the route at the locations of four maneuvers along the route.

Maneuver arrows 140-146 provide visual cues for maneuvers along the route. In other words, each maneuver arrow is a visual representation of a maneuver along a route. The placement of such an arrow along the route at the location of the maneuver greatly augments the user's understanding of the maneuver as it describes the maneuver in a simple visual format. As shown in FIG. 1, the maneuver arrows are only presented at the location of maneuvers and do not cover the entire route. As further described below, such maneuver arrows are highly useful when a complex set of maneuvers have to be sequentially performed in an area of the map that is congested with multiple roads and/or intersections.

In some embodiments, the maneuver arrows are selectable items in GUI 100. As shown in the second and third stages 102 and 103, the selection of a maneuver arrow directs the mapping application to differentiate the appearance of the selected maneuver arrow from the other arrows and to present a banner 150 with maneuver instructions. Specifically, the second stage 102 shows the user selection of the maneuver arrow 144.

The third stage 103 shows GUI 100 after the user selects maneuver arrow 144. In the third stage 103, the color of maneuver arrow 144 has changed to white to indicate that the arrow has been selected. In some embodiments, the selection of an arrow may be indicated in different ways, such as with a different color, different highlighting, different size (e.g., an enlarged arrow), etc. The colors white and black are used for selected and unselected maneuver arrows in the examples above and below as these colors lend themselves to the black and white drawing colors of the figures. However, one of ordinary skill will realize that in the examples illustrated in FIGS. 1-10, as well as other embodiments of the invention, the mapping application can use any other colors, shading, highlight, size, or other visual cues to differentiate between selected and unselected arrows.

The selection of the arrow 144 causes the GUI 100 to show the banner 150 with direction arrow 152 and direction text 154 to provide details regarding the selected maneuver arrow 144. While FIG. 1 shows different instructions for different maneuvers in the same banner 150, other embodiments provide different maneuver instruction banners for different maneuvers and animate between the presentations of these different banners, as further described below. In the banner 150, the direction arrow 152 shows that the selected maneuver is a right turn, and direction text 154 describes the selected maneuver as a right turn at 7th Ave. As further described below, the maneuver arrow along the route is not always visually aligned with the direction arrow of a maneuver instruction in some embodiments, because the GUI 100 may display a map that is not aligned with the direction of the route.

The third stage 103 also shows the user selecting a different maneuver arrow 142. As shown in the fourth stage 104, this selection directs the GUI 100 to change the color of the maneuver arrow 144 to black and the maneuver arrow 142 to white to indicate that the arrow 144 is no longer selected and that the arrow 142 is selected. Banner 150 has also been updated to reflect the details of the maneuver indicated by the new maneuver arrow 142. In some embodiments, when a new arrow is selected, the mapping application provides a transition animation between two different banners that provide the different maneuver instructions for the previously selected maneuver and the new maneuver arrow. An example of this transition is described below.

Figure 2:
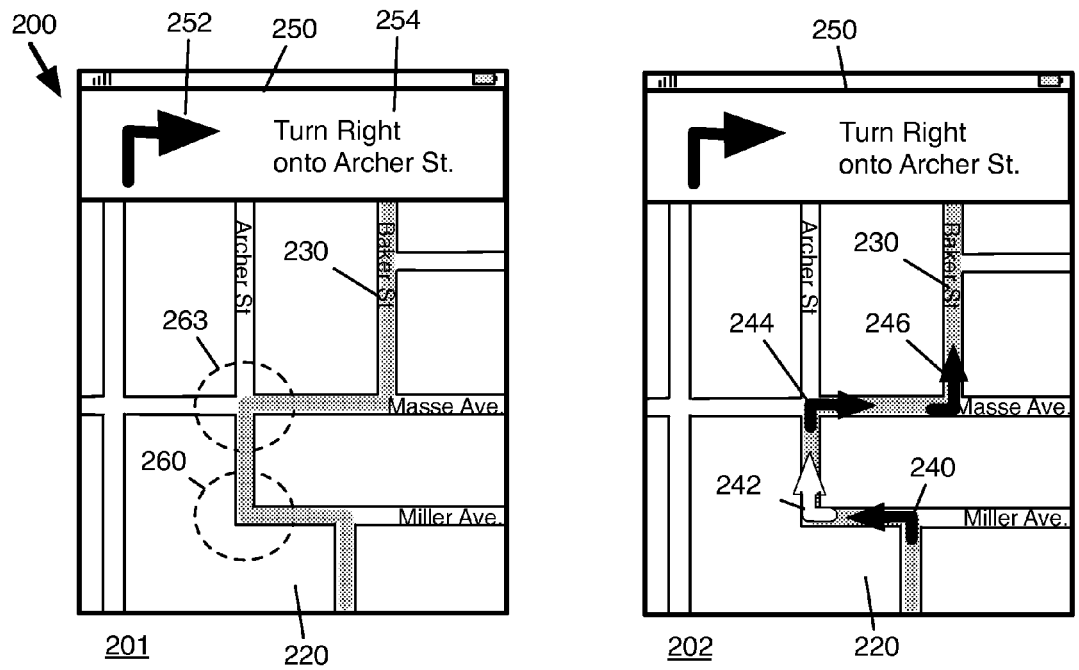
FIG. 2 illustrates an example of some benefits of providing maneuver arrows for a route.

FIG. 2 illustrates an example of some benefits of providing maneuver arrows for a route, particularly when road names are unclear or unavailable. This example is illustrated in two stages 201-202. The first stage 201 shows a GUI 200 that has (1) a display area 220 that displays a map, (2) a route 230 that traverses along several streets on the map, and (3) a banner 250 that corresponds to a maneuver along the route.

In the example illustrated in FIG. 2, the route starts at the bottom of the map and traverses to the top of the map. In this traversal, the route traverses through two intersections 260 and 263. With a brief glance at banner 250, a user may determine that a right turn is to be made based on direction arrow 252. The user may further determine that the right turn must occur at either intersection 260 or intersection 263 based on a quick view of the map display area 220 because turns at intersections 260 and 263 are the only right turns along the route indicator 230.

However, without reading the direction text 254 of banner 250 and the actual street names on the map display area 220, it would not be clear which intersection 260 or 263 the banner 250 is describing. This confusion could be addressed by putting a dashed circle (like the ones illustrated in FIG. 2) around the intersection that corresponds to the banner 250, but such a geometry is hard to see in some environments. Moreover, the map might be rotated so that the route traverses from the top of the screen towards the bottom of the screen. In this case, the right turns at the intersections 260 and 263 will look like left turns to a user who incorrectly assumes that the route is traversing from the bottom to the top of the screen. This confusion will further make it difficult for the user to associate the maneuver instruction in the banner 250 to the maneuver along the route on the map.

The second stage 202 shows an alternative rendering of the map in the map display area 220. This rendering is identical to the rendering illustrated in the first stage 201, except that the map in the second stage 202 has maneuver arrows 240-246. With the maneuver arrows 240-246, it is clear from a quick glance that banner 250 is referring to the intersection at maneuver arrow 242, because this maneuver is uniquely identified by the arrow 242 having a different color than the rest of the maneuver arrows. Although both maneuver arrows 242 and 244 are right turn arrows, maneuver arrow 242 is displayed in a different color (i.e., white) to distinguish it from the other visible maneuver arrows 240, 244, and 246. This different color conveys to the user that the arrow 242 represents the maneuver that is the subject of banner 250. Moreover, by comparing the alignment of the maneuver arrow 242 with the arrow 252 in the banner 250, the user can quickly determine that the orientation of the map display matches the orientation of travel.

Figure 3:
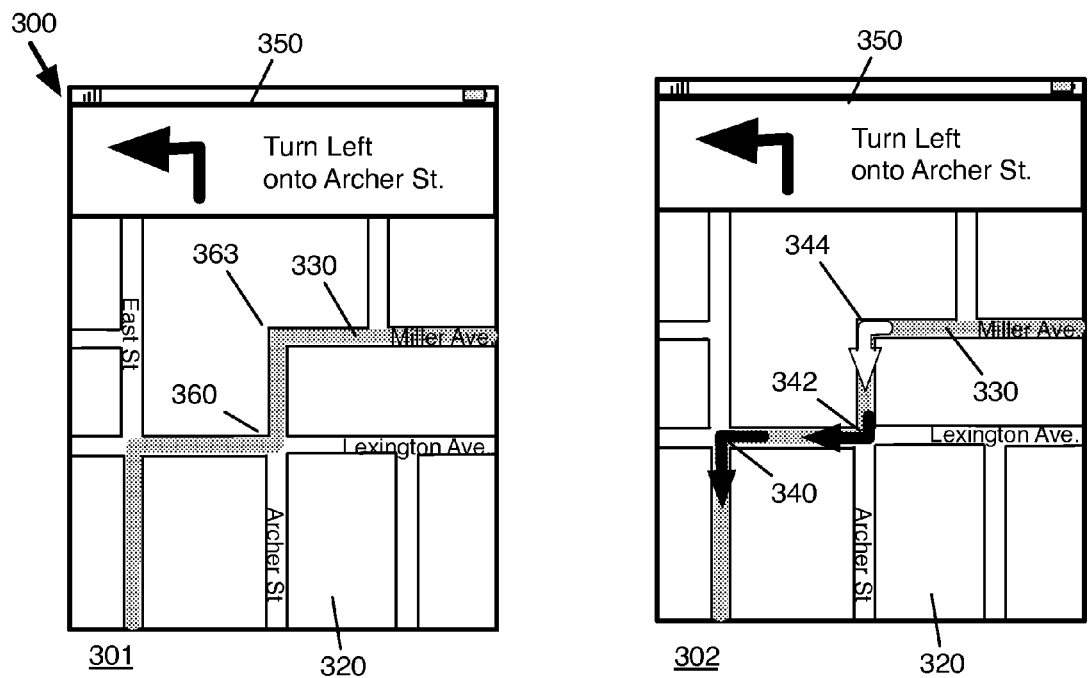
FIG. 3 illustrates another example of some benefits of providing maneuver arrows for a route even when road names are clearly available.

In the example of FIG. 2, the banner 250 describes a right turn onto Archer Street with direction arrow 252 and direction text 254. With a longer look at the map display area 220, a user could determine the location of Archer Street, and specifically identify which turn along the route would be a right turn onto Archer Street. However, in some cases, even using the available information, a user would be unable to determine which maneuver instruction a banner is describing. FIG. 3 illustrates an example of such a situation. This figure illustrates its example in two stages 301-302. The first stage 301 illustrates a GUI 300 with a display area 320 that displays a map, a route 330 that traverses through two intersections 360 and 363, and a banner 350 that provides instructions for a left turn along the route (which in this example is a left turn on Archer St.).

Because the map may be rotated in any particular manner, and because there are two opposing turns on Archer street in this example, a user cannot be certain which turn along Archer street corresponds to the instructions in the banner 350. In other words, given that the direction of the route traversal across the screen depends on the orientation of the map, the user needs additional information to correlate the maneuver instructions in the banner 350 with one of two opposing turns on the same street.

In this example, the route starts from the right side of the screen, makes a left turn on Archer street, then a right turn on Lexington avenue, and finally a left turn on East street. Without maneuver arrows or some other visual indicator, the user would not know if the left turn on Archer street is made from Lexington onto Archer or from Miller onto Archer, because the user would not know the direction that the route traverses across the screen. With the maneuver arrows, this problem is solved, as illustrated by the second stage 302 of FIG. 3. As shown in this stage, the different color of maneuver arrow 344 identifies it as the arrow that is associated with the maneuver direction. Moreover, the direction of the arrow 344 identifies which turn is onto Archer and which turn is off Archer. Also, by seeing that the alignment of this arrow is rotated 90 degrees from the direction of the arrow in the banner 350, the user can quickly determine that the map display has a 90 degree rotation with respect to the direction of travel.

The second stage 302 shows the same map display area 320, route indicator 330, and banner 350 from the first stage. In addition, the second stage shows maneuver arrows 340, 342, and 344. With the maneuver arrows, it is clear from a quick glance that banner 350 is referring to maneuver arrow 342 because the selected maneuver arrow 342 is shown in a different color and makes it clear where the left turn onto Archer Street occurs. Also, maneuver arrow 342 is displayed in a different color (i.e., white) to distinguish it from the other visible maneuver arrows 340 and 344.

Several more detailed embodiments will now be described in Sections I-III. Section I below describes the user interface for displaying and interacting with maneuver arrows of the mapping application of some embodiments. Section II then describes how the mapping application of some embodiments generates maneuver arrows. Section III then describes electronic devices that employ the mapping application of some embodiments.

I. User Interface

Figure 4:
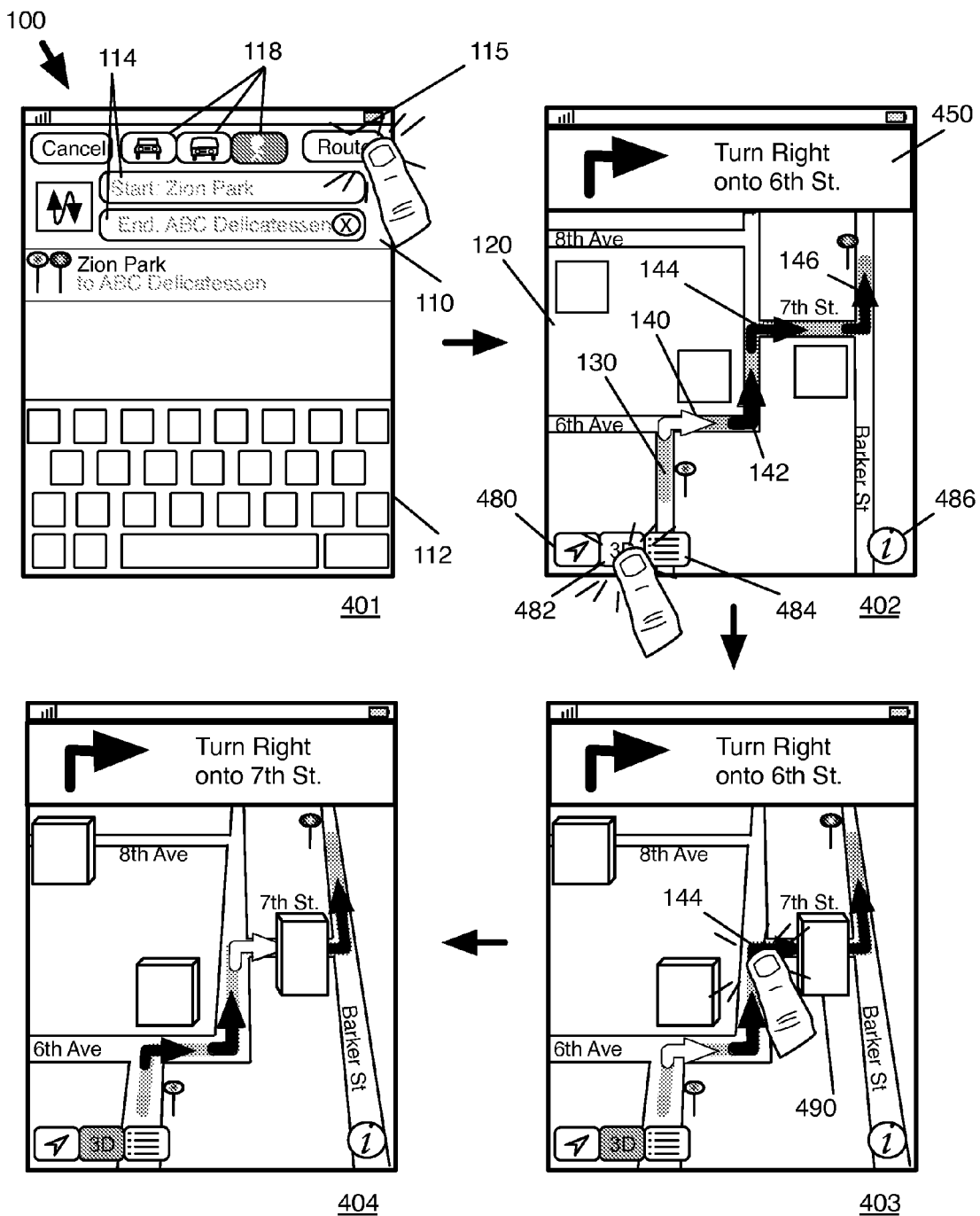
FIG. 4 illustrates an example of a mapping application with maneuver arrows in 2D and 3D views.

Once the mapping application displays maneuver arrows on a map, the user may interact with the maneuver arrows in some embodiments. When the map can be presented in both a two-dimensional (2D) view and a three-dimensional (3D) view, the interaction with the maneuver arrows can be in both the 2D view or the 3D view. FIG. 4 illustrates an example of this interaction. Specifically, it illustrates the same example as that described above by reference to FIG. 1, except that now in FIG. 4 the maneuver instruction banners appear once the route is first displayed and the maneuver arrows are shown in both the 2D and 3D views of the map. FIG. 4 illustrates its example in four stages 401-404.

The first stage 401 is identical to the first stage 101 of FIG. 1. It simply shows the user requesting a route to be generated from Zion park to ABC Delicatessen. Like second stage 102 of FIG. 1, the second stage 402 shows the route 130 along with maneuver arrows 140-146. However, the second stage 402 also shows that, unlike GUI 100 of FIG. 1, the GUI 400 of FIG. 4 presents a maneuver instruction banner 450 once it first displays a route. The first maneuver instruction banner provided by the GUI 400 relates to the first maneuver along the route. Accordingly, to identify the maneuver arrow associated with this first maneuver instruction banner, the GUI 400 presents the first maneuver arrow 140 as white to differentiate its appearance from the other maneuver arrows that it presents as black.

The second stage 402 also shows several sets of floating controls that are overlaid on the map 120. These controls include (1) a position control 480 for displaying the current position of the device that executes the mapping application, (2) a 3D control 482 for toggling the map view between a top-down 2D view and a perspective 3D view, (3) a list control 484 for providing a list of maneuvers along the route, and (4) an information control 486 for viewing additional controls relating to the map view. One skilled in the art will recognize that many different layouts for floating controls could be used. The second stage 402 shows the user's selection of the 3D control 482.

The third stage 403 shows that the map display has changed from the top-down 2D display of stage 402 to a perspective 3D display. The route, maneuver arrows and maneuver instruction banner are still shown in the 3D display, but now the route and maneuver arrows are rendered as 3D objects with the correct perspective presentation that wraps around other objects in the scene. The mapping application renders the maneuver arrows according to the perspective of the map view similarly to the other objects in the display. Like the other rendered objects (e.g., buildings, routes, and roads), maneuver arrows may be layered above or below other objects in the scene, and they may be occluded by other objects that are rendered in front of them. For example, a portion of maneuver arrow 144 is occluded from view by a building 490 in the map view. In the display of this example, the arrows are rendered as flat objects along the route, but in some embodiments, the maneuver arrows are rendered as 3D objects with height. The third stage 403 also shows the user selecting the maneuver arrow 144.

The fourth stage 404 shows that the selection of the maneuver arrow 144 causes the maneuver banner 492 to appear in place of banner 450. The banner 492 displays an arrow and text that describe the maneuver represented by the maneuver arrow 144. The fourth stage 404 also shows the maneuver arrow 144 as white and the maneuver arrow 140 as black along with the arrows 142 and 146, in order to convey that the arrow 144 is the arrow that correlates with the banner 492.

Figure 5:
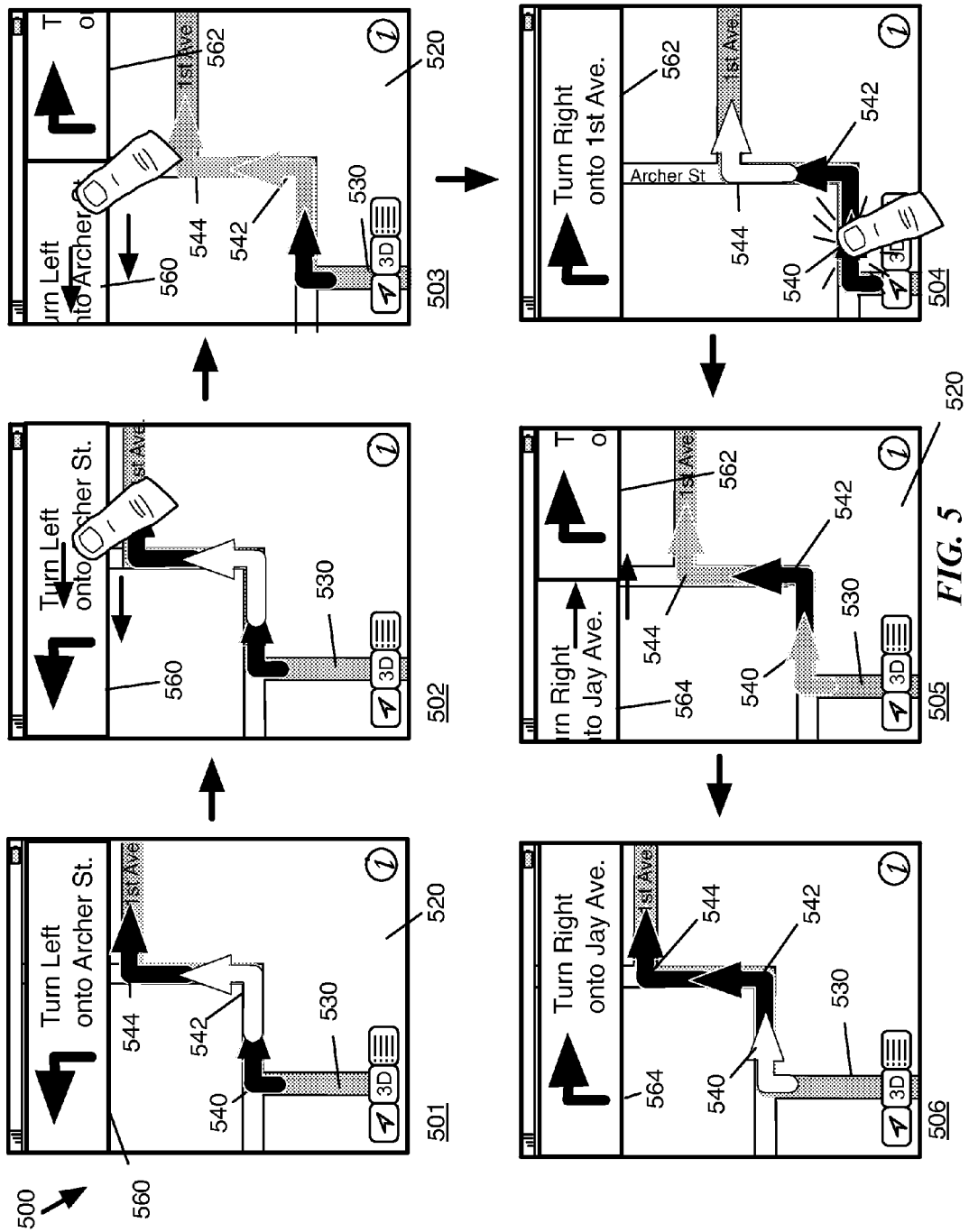
FIG. 5 illustrates a more detailed example of the interaction with the maneuver arrows and their associated maneuver instruction banners.

FIG. 5 illustrates a more detailed example of the interaction with the maneuver arrows and their associated maneuver instruction banners. Specifically, this figure illustrates, in six stages 501-506, two methods for selecting a maneuver arrow. The first stage 501 shows GUI 500 with a map display area 520, a route 530, a banner 560, and maneuver arrows 540, 542, and 544. This stage also shows the maneuver arrow 542 as being selected and the banner 560 displaying details regarding the maneuver associated with this arrow 542.

The second stage 502 shows the user swiping the banner 560 from right to left in order to select a new maneuver instruction for the next maneuver along the route. The next maneuver along the route is the maneuver associated with the maneuver arrow 544. The third stage 503 shows that when the user swipes the banner 560, the GUI 500 shows a transition animation. The banner 560 that showed the description for maneuver arrow 542 is swiped off the map display area toward the left and a new banner 562 is brought on the map display area 520 from the right to display maneuver instructions for the maneuver associated with arrow 544. The maneuver arrows 542 and 544 are shown as grey. In this example, the mapping application changes the color of selected arrows from black to white and de-selected arrows from white to black by interpolating between the white and black colors of the arrows, causing the previously selected arrow to fade from white to black and the newly selected arrow to go from black to white. In addition, the GUI 500 shows the map in the map display area 520 shifting from the previous position shown in stage 502 to a new position along the route. This position is a position that is centered about the next maneuver in the route, which is represented by the next maneuver arrow 544 in the GUI 500.

The fourth stage 504 shows the map display after the transition animation has completed. GUI 500 shows the new banner 562, which displays details regarding the selected maneuver arrow 544. The selected maneuver arrow 544 is displayed in white in the center of GUI 500, while the previously selected arrow 542 is now displayed in black. The arrow 544 appears white while the other two arrows 540 and 542 are black in order to convey that the arrow 544 is the arrow that corresponds to the banner 562.

The fourth stage 504 also shows another method for selecting a maneuver arrow. In the fourth stage 504, the user selects maneuver arrow 540 by tapping on the maneuver arrow 540. The fifth stage 505 then shows that in response the GUI 500 again shows a transition animation. This time, the GUI 500 presents an animation that shows the banner 562 moves off-screen towards the right, followed by a new banner 564 that comes in from the right and stops once centered in the display area, as shown in the sixth stage 506. The animation also shows the color transition for the maneuver arrows 544 and 540. The new banner 564 provides details for maneuver arrow 540. The sixth stage 506 also shows the maneuver arrow 540 as white while the other arrows appear as black in order to convey that the arrow 540 is the arrow corresponding to the maneuver instruction banner 564.

While a user may use various methods to manually select different maneuver arrows in the mapping application, in some embodiments, the mapping application of some embodiments also automatically steps through the maneuver arrows and changes the appearance of the arrows as they are selected and unselected. For instance, in some embodiments, the mapping application tracks the position of the device and steps through the maneuver arrows and maneuver instruction banners as the device passes maneuvers associated with these arrows and banners. The mapping application of some embodiments automatically steps through the maneuver arrows and their associated banners in response to the tracked position of the device, in order to provide a navigation-type, step-by-step guidance along a route.

Figure 6:
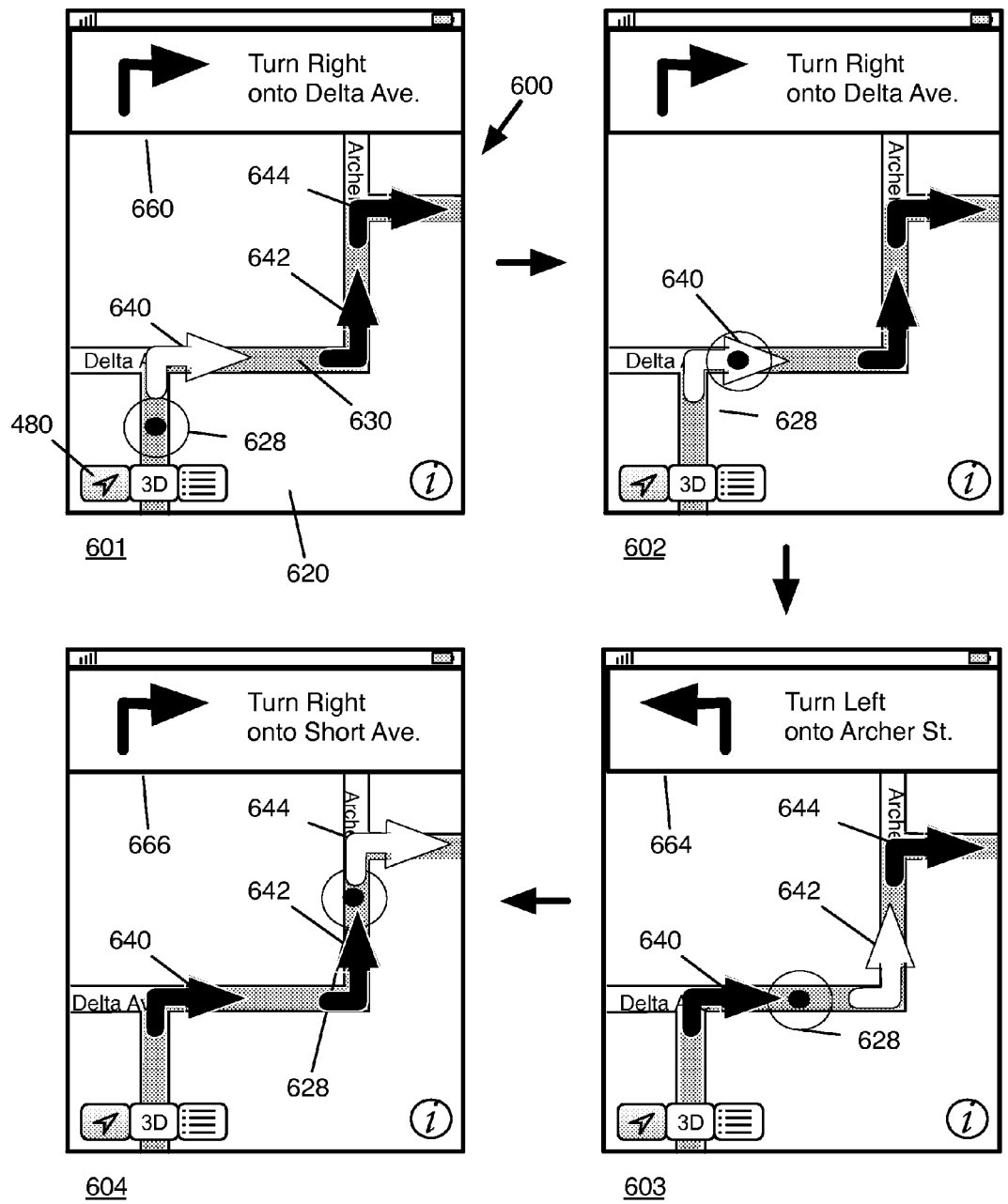
FIG. 6 illustrates an example of the mapping application automatically stepping through of the arrows and banners based on tracked position of the device.

FIG. 6 illustrates an example of the mapping application automatically stepping through of the arrows and banners based on tracked position of the device. This figure illustrates this example in four stages 601-604. The first stage 601 shows a GUI 600 that displays a map 620 and a route along the map with three maneuver arrows 640, 642, and 644. This stage also shows a maneuver instruction banner 660 that provides arrow and text instructions about the next maneuver. The next maneuver is the maneuver associated with the first arrow 640. As this arrow provides instructions for the same maneuver as the banner 662, it is shown as white while the other maneuver arrows are shown as black.

The first stage 601 also shows a location indicator 628 that specifies the tracked location of the device. This location is being tracked as indicated by the highlighting of the position tracking indicator 480. In some embodiments, while the location indicator is behind the next maneuver arrow, the maneuver arrow is shown as the current maneuver arrow (i.e., is shown as white in this example). Accordingly, the second stage 602 shows that while the indicator is going through the maneuver associated with the maneuver arrow 640, the maneuver arrow remains the current arrow and the banner 662 shows instructions for its associated maneuver.

However, as shown by the third stage 603, once the location indicator goes past the maneuver and its associated maneuver arrow, the application automatically selects (without user input) the next maneuver arrow and provides a new maneuver instruction banner 664 for this arrow to explain the upcoming maneuver. In this example, the third stage 603 shows the arrow 642 as white and the other arrows 640 and 644 as black to convey that the arrow 642 is for the upcoming maneuver that is described in the maneuver instruction banner 664.

Similarly, the fourth stage 604 shows that once the location indicator goes past the maneuver arrow 642, the application selects the next maneuver arrow 644, changes the color of this arrow to white, changes the color of the arrow 642 to black, and provides a new maneuver instruction banner 666 for the arrow 644 to explain the next upcoming maneuver. In some embodiments, the mapping application pans the map as it tracks the position of the location indicator vis-à-vis the position of the maneuver arrows. For instance, in some embodiments, the mapping application pans the map display to a location that centers or nearly centers about the location of the maneuver arrow when the location indicator 628 reaches or comes close to a maneuver arrow.

II. Creating Maneuver Arrows

In some embodiments, maneuver arrows appear at various maneuver locations (such as intersections, road forks, road merges, etc.) along a route. The mapping application of some embodiments generates the maneuver arrows based on a particular rendering model. For instance, in some embodiments, the mapping application defines each maneuver arrow to start before the maneuver and to end after the maneuver along the route. Because of this, maneuver arrows do not always overlap other maneuver arrows as often there is sufficient distance between two maneuvers to allow one maneuver to end before another maneuver begins. However, in certain situations, several maneuvers are front to back and this causes the maneuver arrows to overlap along the route. Maneuver arrows may also overlap at certain zoom levels, while not being visible at other zoom levels.

The mapping application of some such embodiments defines the maneuver arrows in several layers so that between each two successive arrows, the one that is closest to the start of the route is stacked higher than the other arrow. This layering model is used to ensure that the maneuver arrows that are closest to the start of the route have greater visibility than the arrows that are further from the start. Some embodiments follow this layering model except for the currently selected maneuver arrow, which these embodiments display as the highest layer arrow. Again, this model ensures that the currently selected maneuver arrow has the greatest visibility in the sequence of arrows.

Figure 7:
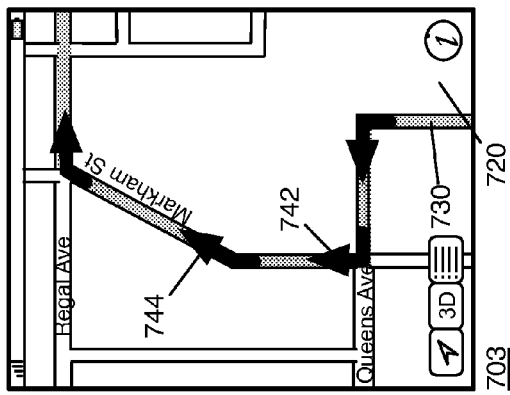
FIG. 7 illustrates the mapping application defining each maneuver arrow to start before a maneuver and end after a maneuver.
Figure 7:
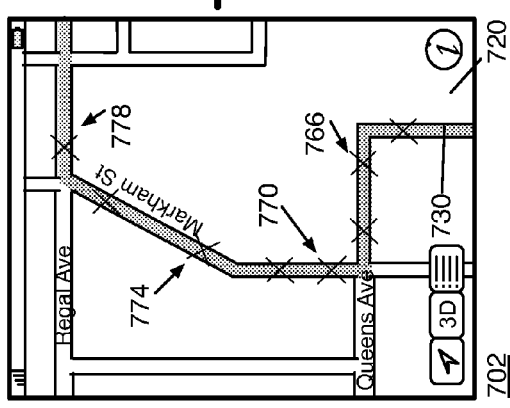
Figure 7:
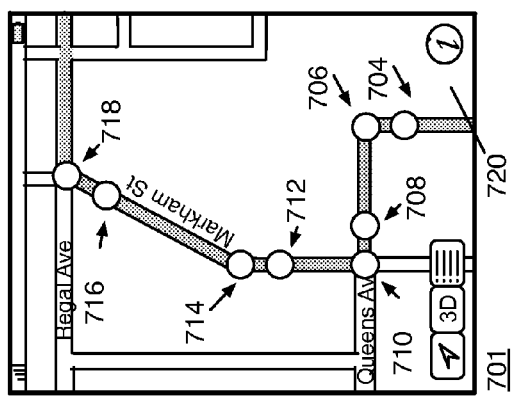

The above-discussed rendering model will now be described by reference to FIGS. 7-9. FIG. 7 presents an example that illustrates the mapping application defining each maneuver arrow to start before a maneuver and to end after the maneuver. This figure illustrates this example in three stages 701, 702 and 703. The first stage shows a GUI 700 of the mapping application. This GUI displays a map with several roads and a route 730 along some of these roads. There are four maneuvers along this route, three of which account for turning from one road to another, and one of which accounts for a bend in a road.

The mapping application of some embodiments receives the route definition that describes the route 730. For each maneuver, this definition in some embodiments includes a pair of location markers, one marker that specifies the location at which the mapping application should provide the first maneuver instruction for the maneuver and another marker that specifies the location at which the mapping application should provide the last maneuver instruction for the maneuver. In some embodiments, the start and end maneuver instruction locations are provided in the route definition in order to allow the mapping application to provide the first and last voice or audible instructions during turn-by-turn navigation of the route. The mapping application in some of these embodiments conveniently uses these locations as the starting inputs for generating the maneuver arrows.

The first stage 701 shows four pairs of start and end locations 704-718 for the four maneuvers along the route. As shown in this stage, the end location for each maneuver is specified at the location of the intersection or bend associated with the maneuver. Accordingly, if the maneuver arrow is defined to terminate at the originally specified end location for each maneuver, the arrow would terminate in the middle of the intersection. However, having the maneuver arrows terminate in the middle of an intersection is not that informative.

Hence, as shown by the second stage 702, the mapping application of some embodiments extends the end location for each maneuver a little further along the route so that the end of the maneuver will be beyond the location associated with the middle of the intersection or bend. Specifically, the second stage 702 shows four new pairs of start and end locations 764-778 for the four maneuvers along the route. As shown in this stage, the starting location for each maneuver in the second stage is the same as the starting location for the maneuver in the first stage. However, each maneuver's ending location (766, 770, 774 or 778) is further along the route in the second stage than the corresponding ending location (706, 710, 714 and 718) of the first stage.

The third stage 703 shows the benefit of extending the end location of the maneuver. Specifically, this stage shows that the mapping application defines each maneuver arrow between the start and end locations that were defined for the arrow's associated maneuver in the second stage. The third stage 703 shows that the extension of the end location of each maneuver causes the maneuver's corresponding arrow to bend around the intersections and around the road bends in order to provide a more complete visual indication of the maneuver to the user. When the maneuver arrows extend beyond the road bend or intersection, a user can clearly see the direction for each maneuver.

Figure 8:
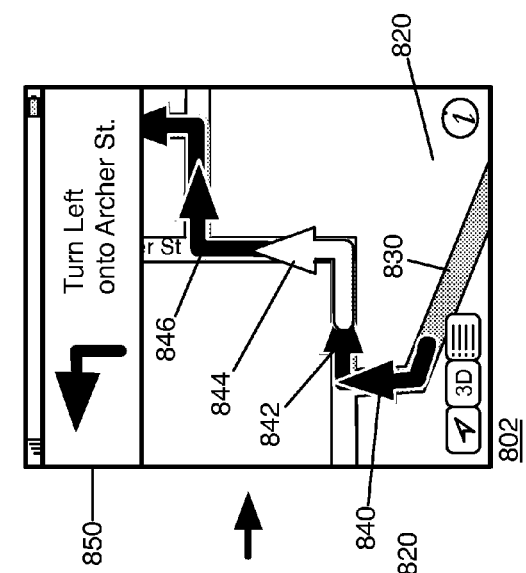
FIG. 8 illustrates the layering model of some embodiments for overlaying the maneuver arrows that overlap on a route.
Figure 8:
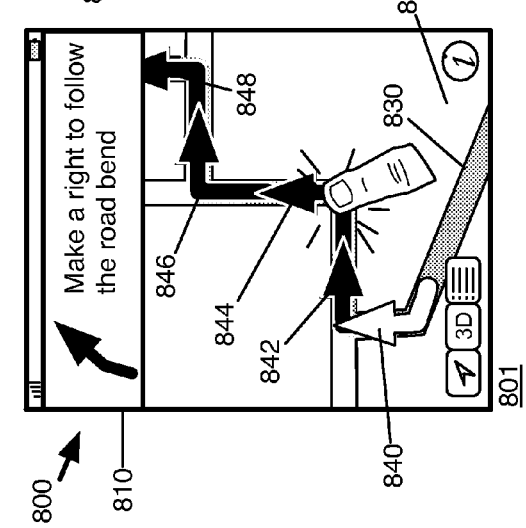
Figure 9:
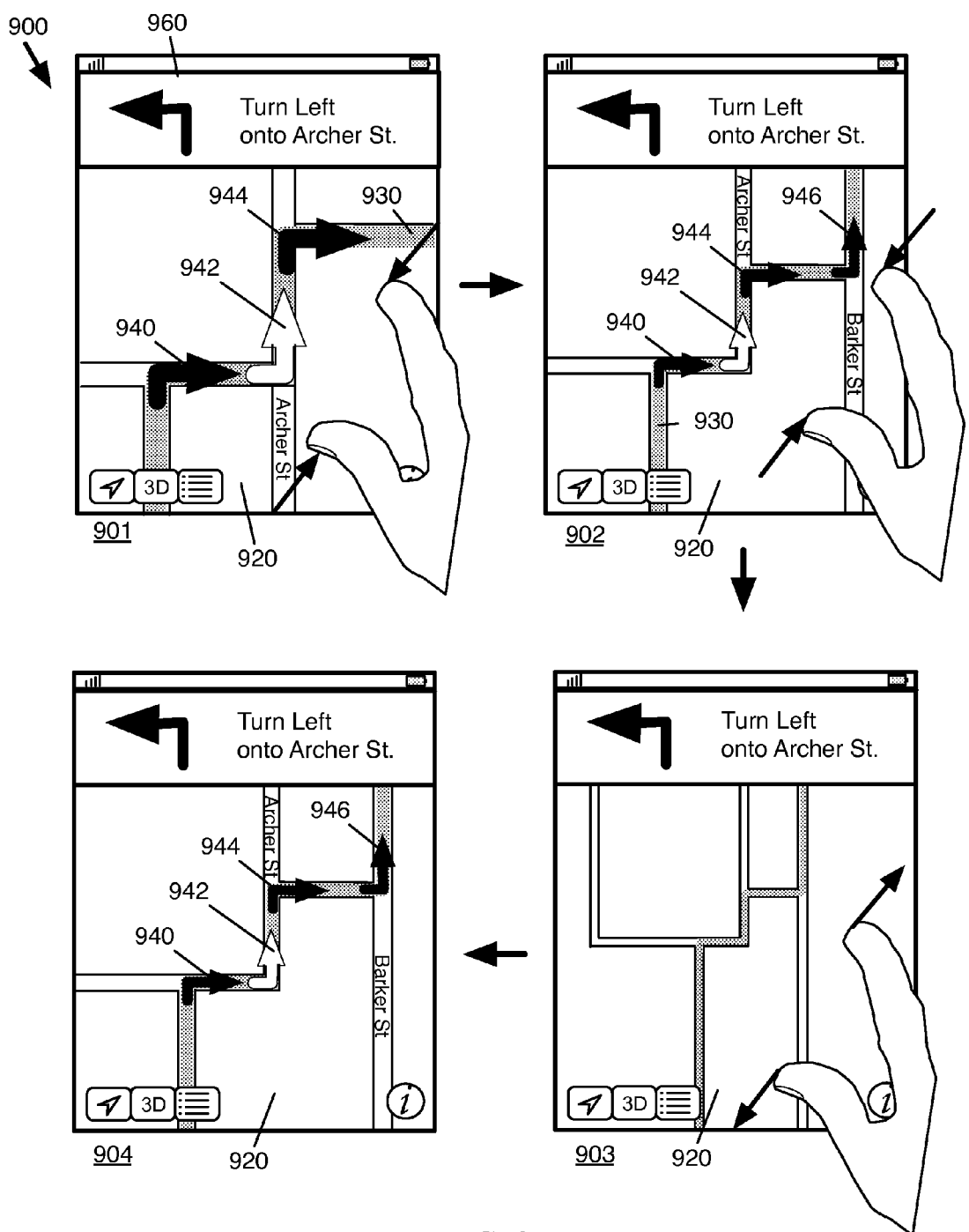
FIG. 9 illustrates the display of maneuver arrows at some zoom levels and the removal of these arrows at other zoom levels.

FIG. 8 illustrates the layering model of some embodiments for overlaying the maneuver arrows that overlap on a route. In some embodiments, the mapping application prioritizes the maneuver arrows according to their order along the route. In some such embodiments, between two maneuver arrows, the mapping application prioritizes (e.g., overlays) the maneuver arrow nearer to the beginning of a route over the other maneuver arrow, unless the other arrow is the selected arrow, in which case it is prioritized over the nearer arrow.

FIG. 8 illustrates the overlaying of the maneuver arrows in two stages 801-802. The first stage 801 shows the map application's GUI 800. This GUI displays a map with a route 830 and five overlapping maneuver arrows 840-848. As shown by the maneuver arrows 840-848, the route 830 goes from the bottom of the map display to the top. Maneuver arrow 848 is the closest to the destination of route indicator 830 and maneuver arrow 840 is the closest to the starting location of the route indicator 830. Maneuver arrow 840 is white while the other maneuver arrows are black, in order to convey that the arrow 840 corresponds to the maneuver instructions provided by the banner 810.

The first stage shows that maneuver arrows 840-848 overlap with each other based on a layering model that between two arrows, places the arrow that is closest to the destination on lower layer than the other arrow. According to this model, the arrow 848 is drawn under arrow 846, arrow 846 is drawn under arrow 844, arrow 844 is drawn under arrow 842, and arrow 842 is drawn under arrow 840.

As mentioned above, the layering model of FIG. 8 prioritizes the arrows earlier in the route over the arrows later in the route except for the currently selected arrow that it prioritizes higher than all other arrows. To illustrate this, the first stage 801 shows the user selecting the maneuver arrow 844. The second stage 802 shows that in response the mapping application shows the selected maneuver arrow 844 above the other maneuver arrows. Where maneuver arrow 844 was below maneuver arrows 842 and 840 in the first stage 801, the maneuver arrow 844 is now shown above maneuver arrow 842. All other maneuver arrows maintain their respective order. In other embodiments, however, the priority for drawing a maneuver arrow will be based on something other than the origin of the route. For example, in some embodiments, when a maneuver arrow is selected, the arrows closest to the maneuver arrow will be drawn above those that are further away. For example, with reference to FIG. 8, in some embodiments, maneuver arrow 842 would be drawn above maneuver arrow 840 because it is closer to selected maneuver arrow 844. The second stage 802 also shows the selected maneuver arrow 844 in white and provides a maneuver instruction banner 850 for this maneuver.

As mentioned above, the mapping application of some embodiments displays maneuver arrows at only some of the zoom levels. This is because at certain zoom levels, the roads or the routes might be too small to be able to render maneuver arrows that are large enough to be meaningful. FIG. 9 presents an example that illustrates the display of maneuver arrows at some zoom levels and the removal of these arrows at other zoom levels. This example is illustrated in four stages 901-904.

The first stage 901 displays a GUI 920 that displays a map of several roads, a route traversing along a portion of the roads, and several maneuver arrows 940, 942, and 944 along the route. In the first stage, a user uses a pinch motion to zoom out the view of the map in order to see a larger portion of the map displayed in the display area 920. One skilled in the art will understand that different methods may be used to zoom in and out of a map (e.g., on-screen controls, keyboard hotkeys, etc.).

In the second stage 902, the map display area 920 shows a larger portion of the map than the portion shown in the first stage 901. With the zoomed out view of the map display area 920, another maneuver arrow 946 is now visible on the map display area 920. In this example, along with the route 930 and the roads, the mapping application makes the maneuver arrows 940-946 proportionally smaller to fit them in the zoomed out area. In the second stage, the user uses the pinch motion to zoom out even further.

The third stage 903 shows an even larger portion of the map in the map display area 920. However, in this stage the GUI 900 no longer shows the maneuver arrows 940-946. Because the zoom level of the map has exceeded a threshold zoom level for the display of maneuver arrows, the mapping application no longer displays maneuver arrows on the map display area 920. In the third stage 903, the user uses another gesture motion (i.e., spreading two fingers apart) to zoom back into the map display area 920.

The fourth stage 904 shows the same view as the second stage 902 with maneuver arrows 940-946 as a result of the last operation. The maneuver arrows 940-946 are again visible in the map display area 920. When a user zooms out too far, the mapping application will cease to display the maneuver arrows until the user zooms back in to an allowed range.

Figure 10:
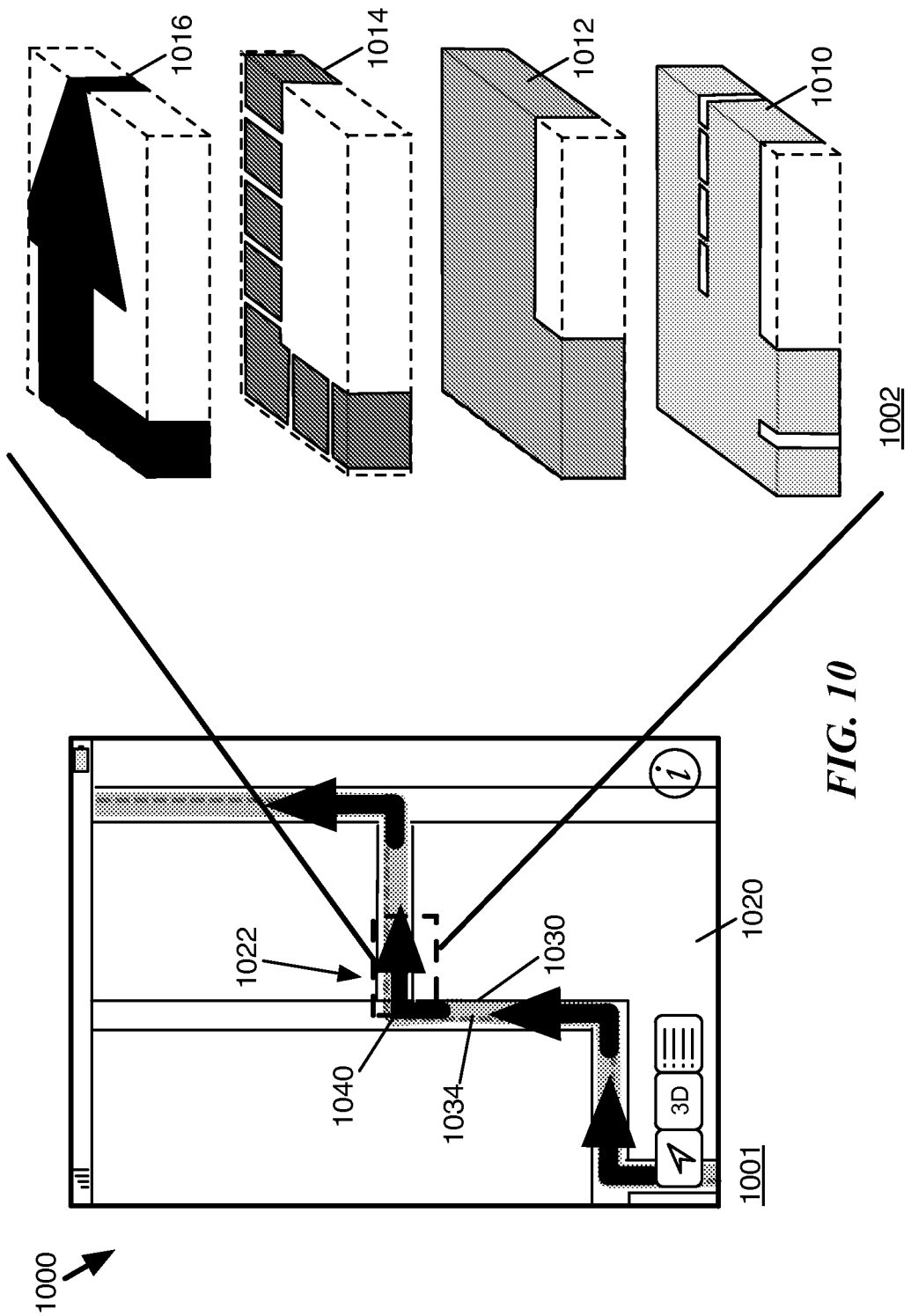
FIG. 10 illustrates the layered approach that the mapping application of some embodiments employs to render roads, routes, traffic, and maneuver arrows.

The mapping application of some embodiments renders maneuver arrows in a particular order with respect to other arrows, as described above by reference to FIG. 8. In addition, the mapping application of some embodiments renders the maneuver arrows with respect to other objects in the rendered 2D or 3D map display according to a particular order. FIG. 10 illustrates the layered approach that the mapping application of some embodiments employs to render roads, routes, traffic and maneuver arrows. In some embodiments, the mapping application renders mesh objects for the roads, routes, traffic, and maneuver arrows in different layers of a map. This figure shows the layered rendering in two views 1001 and 1002. The first view 1001 shows the result of the layered rendering of some embodiments. The second view 1002 shows a layered view of a section 1022 of the map display area 1020.

The first view 1001 shows a map display area 1020, route 1030, traffic indicators 1034, and a maneuver arrow 1040. Traffic indicator 1034 represents traffic data that is presented on the map in some embodiments. The traffic indicator displays different visual representations of congestion along a route. Some embodiments specify the traffic indicators, along with the road, route and maneuver arrows, in terms of vector data. In these embodiments, the map application uses vector drawing techniques to render the roads, routes, traffic indicators and maneuver arrows in 2D or 3D renderings of the map display.

The second view 1002 shows how the road, route, traffic and maneuver arrows are layered for rendering. In order to display the map shown in the first view 1001, the mapping application of some embodiments renders each of the different components of the map in separate layers. The second view 1002 shows road layer 1010, route layer 1012, traffic layer 1014, and maneuver layer 1016.

In this example, the bottom-most layer is the road layer 1010. The road layer represents the road data of the mapping application. The road layer 1010 visually represents various different kinds of roads, such as freeways, dirt roads, and paved roads. Above the road layer 1010 is the route layer 1012 which represents route data. The route data in some embodiments is received from an external routing server that is used to generate routes. The route layer 1012 is rendered on top of the road layer 1010. The traffic layer 1014 is then rendered on top of the route layer 1012, to indicate traffic congestion along the route. Finally, the mapping application renders the maneuver arrows in the maneuver layer 1016 on top of all of the other layers. By rendering the maneuver arrows on top, the mapping application allows a user to interact with the maneuver arrows and to clearly see the location of maneuvers along the route.

In some embodiments, objects within a particular layer may also be layered. For example, the maneuver arrows of some embodiments, in addition to being rendered in a layer above the roads, routes, and traffic, are also layered within the maneuver arrow layer. As described above, the maneuver arrows in some embodiments overlap with each other, and layering allows the overlapping maneuver arrows to be presented in the desired order.

Figure 11:
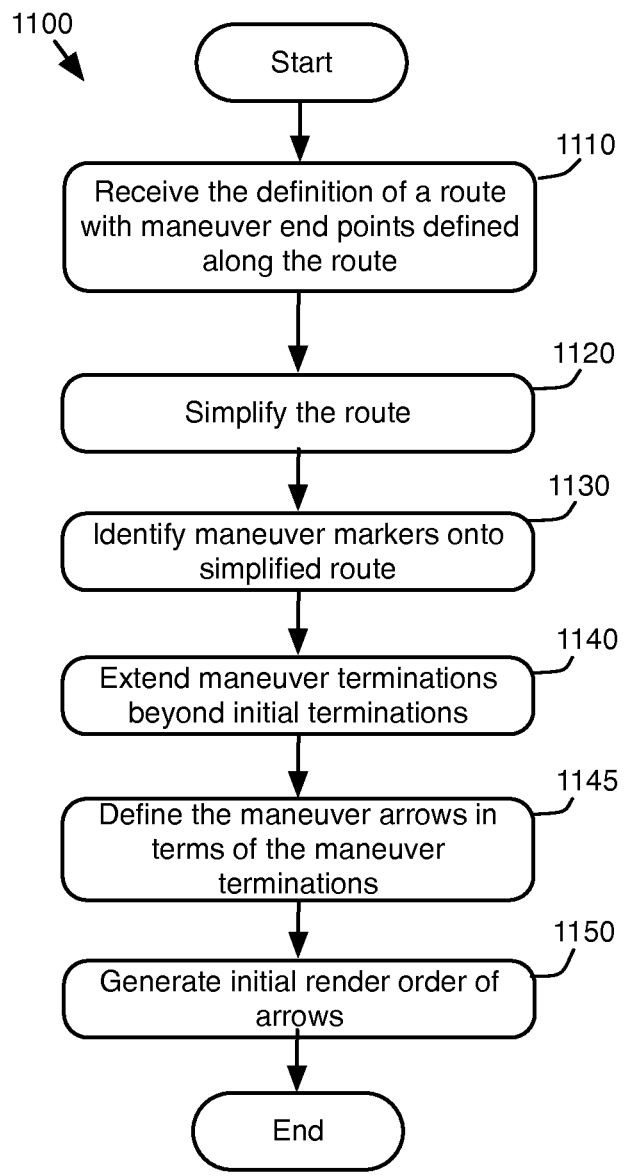
FIG. 11 conceptually illustrates a process of some embodiments to generate maneuver arrows for a route.

FIG. 11 conceptually illustrates a process 1100 that the mapping application of some embodiments performs to generate maneuver arrows for a route. For faster rendering, the process 1100 specifies the definition of the maneuver arrows based on a simplified definition of the route along which these maneuvers are defined. Also, this process extends each maneuver's endpoint in order to ensure that the maneuver arrow extends beyond the maneuver's bend. The process 1100 will be described by reference to FIG. 12, which provides six different illustrations 1201-1206 to elaborate several operations of the process 1100.

Figure 12:
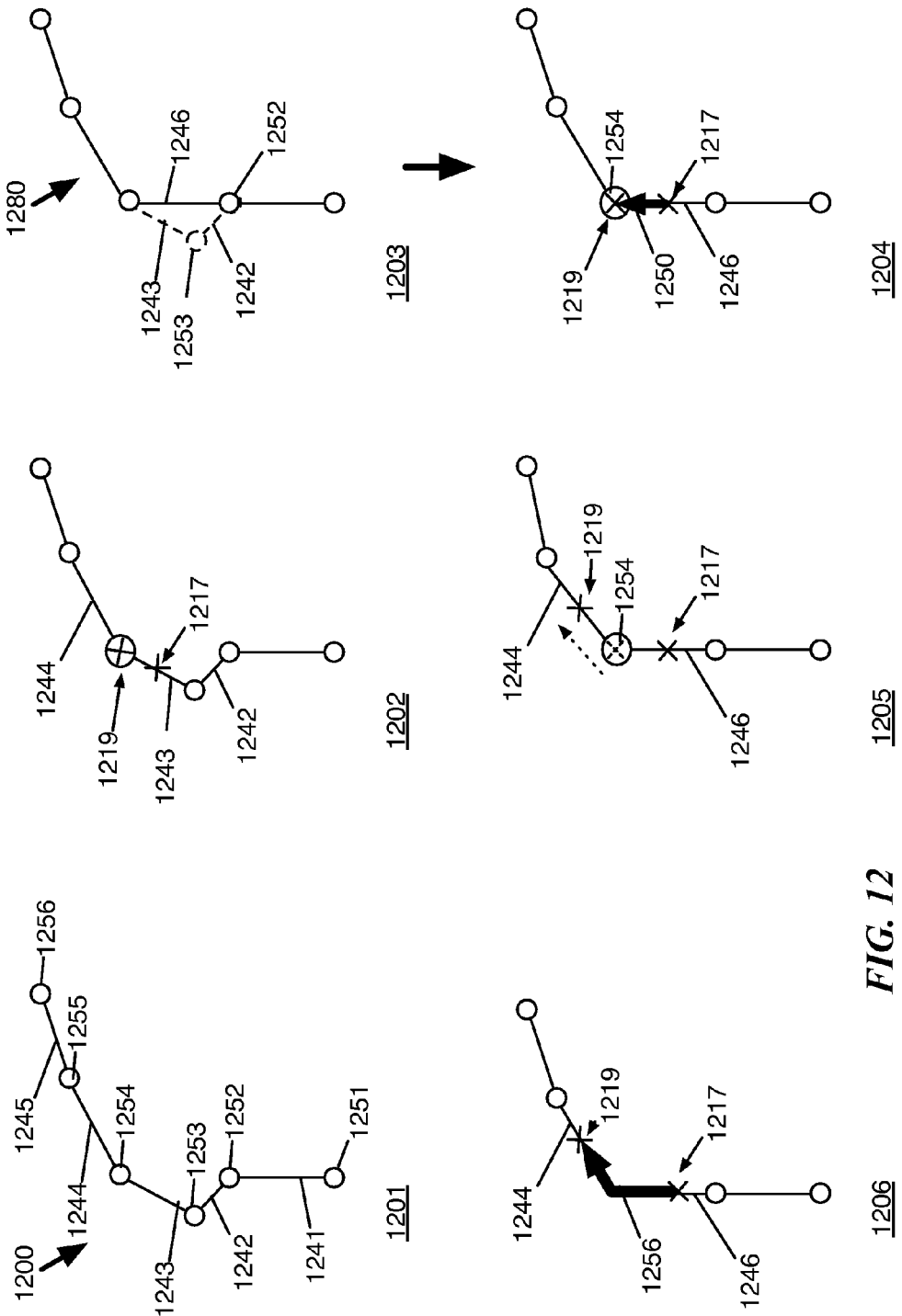
FIG. 12 illustrates an example of generating maneuver arrows for a route.

As shown in FIG. 11, the process 1100 initially receives (at 1110) a definition of a route between a first location and a second location on the map with maneuver end points defined along the route. In some embodiments, the definition of the route is received from an external routing server, which generates the route at the request of the mapping application. In other embodiments, routes are retrieved locally from a data storage of the mapping application. The first example 1201 of FIG. 12 illustrates a representation of a generated route 1200. The route 1200 is composed of multiple route segments 1241-1245 with corresponding nodes 1251-1256 that are placed at the intersections of the route segments.

The received routes also include maneuvers with a pair of end points (a starting marker and an ending marker) for each maneuver along the route as a part of the route definition. In some embodiments, an external routing server provides the maneuver end points as a part of the generated route definition. The mapping application of other embodiments identifies the maneuver end points based on a received route definition.

In some embodiments, each maneuver's end points include one location at which the mapping application should provide the first maneuver instruction for the maneuver and another location at which the mapping application should provide the last maneuver instruction for the maneuver. The start and end maneuver instruction locations in some embodiments are provided in the route definition in order to allow the mapping application to provide the first and last voice or audible instructions (e.g., turn left, keep straight, etc.) during turn-by-turn navigation of the route. The mapping application in some of these embodiments conveniently uses these locations as the starting inputs for generating the maneuver arrows.

The second example 1202 of FIG. 12 illustrates a beginning marker 1217 and an ending marker 1219 on route segment 1243. The beginning marker 1217 indicates a location or index along the route segment where a maneuver instruction begins. The ending marker 1219 similarly indicates the location where a maneuver instruction ends. In some embodiments, each maneuver instruction ends at the juncture, or node, between two route segments. In this example, the ending marker 1219 for the maneuver instruction ends at the juncture between route segments 1243 and 1244.

After the maneuver terminations have been identified, the process 1100 of FIG. 11 simplifies (at 1120) the generated route for faster rendering. The third example 1203 of FIG. 12 illustrates a simplified route 1280 for the original route 1200. The simplified route has a bump formed by route segments 1242 and 1243 removed. In order to simplify a route, the mapping application of some embodiments traverses the route graph and removes nodes that are within a threshold distance of a previous node. In the example of stage 1203, the mapping application removes node 1253 as this node was within the threshold distance of node 1252. As a result of this removal, route segments 1242 and 1243 are combined into a single route segment 1246.

After simplifying the route, the process 1100 then identifies (at 1130) the maneuver end points of the route definition received at 1110 onto the newly simplified route. When a maneuver marker was previously specified on a route segment that was eliminated during the route simplification, the process uses a measured distance along the original route segment to place the maneuver markers on a new route segment. In other words, the process defines the position of the starting marker for a maneuver on the new segment based on the original positions of the starting and ending markers for the maneuver on the original route segment.

The fourth example 1204 of FIG. 12 shows that the termination markers 1217 and 1219 for the maneuver instruction have been mapped to the newly created route segment 1246. The termination markers 1217 and 1219, which had originally been identified on route segment 1243, have been mapped to a corresponding locations of the new route segment 1246 by measuring the distance back from the node 1254 onto the segment 1246. For example, if a starting marker is located 5 units before the end of the original route segment, the mapping application specifies the starting marker on the simplified route as 5 units before the end of the new route segment. The fourth example 1204 also displays the maneuver arrow 1250 that would result from the locations of the starting and ending markers 1217 and 1219 in this figure. As shown in this example, this maneuver arrow 1250 does not extend beyond the bend of this maneuver, and hence is not as useful in pictorially conveying the properties associated with this maneuver.

The process 1100 extends (at 1140) each maneuver's end marker (i.e., each maneuver's termination) beyond its initial termination point identified at 1130. In some embodiments, maneuver instructions are extended from the end of a route segment to a location on the next route segment. The process in some embodiments adjusts the coordinates of each maneuver's end marker by a specified percentage (e.g., 3%, 5%, etc.). In some embodiments, the specified percentage varies based on the zoom level. In some of these embodiments, the specified percentage is adjusted to keep the maneuver at a fixed size in points on screen. While the process in some embodiments adjusts the end marker location for all maneuvers, the process in other embodiments only adjusts certain types of maneuvers. For example, in some embodiments, maneuver that are turns or bends along a road are extended, whereas maneuver instructions that do not change the direction of travel (e.g., an instruction to continue straight on a particular road) are not extended.

The fifth example 1205 of FIG. 12 illustrates the movement of the ending marker 1219 from being co-located with the node 1254 to a new location on route segment 1244.

Once the starting and ending location markers are defined for each maneuver at 1140, the process 1100 then defines the maneuver arrows in terms of the specified start and end maneuver location markers. Specifically, for each pair of start and end markers, the process defines (at 1145) a maneuver arrow that starts at the start marker and terminates at the end marker. The sixth example 1206 shows the resulting extended maneuver arrow 1256, which has been extended to terminate at the location of the repositioned termination marker 1219. This extended arrow is far more pictorially informative about the nature of the maneuver than the arrow 1250 in the fourth example 1204, which simply terminated at the location of the node 1254. By extending the end of the maneuver to a location on the next route segment, the direction and nature of a particular maneuver is often made much more clear by the resulting maneuver arrow.

After defining each maneuver arrow, the process generates (at 1150) a layering order for the arrows, and then ends. In some embodiments, the process 1100 uses the process 1300 of FIG. 13 to generate the layering order for the arrows. The mapping application of some embodiments stacks the maneuver arrows in order to allow for greater visibility and access for the more immediate maneuvers. The process 1300 in some embodiments prioritizes the maneuver arrows according to their position relative to the start of the route, such that between two maneuver arrows, the process prioritizes (e.g., overlays) the maneuver arrow nearer to the beginning of a route over the other maneuver arrow, unless the other arrow is the selected arrow, in which case it is prioritized over the nearer arrow.

Figure 13:
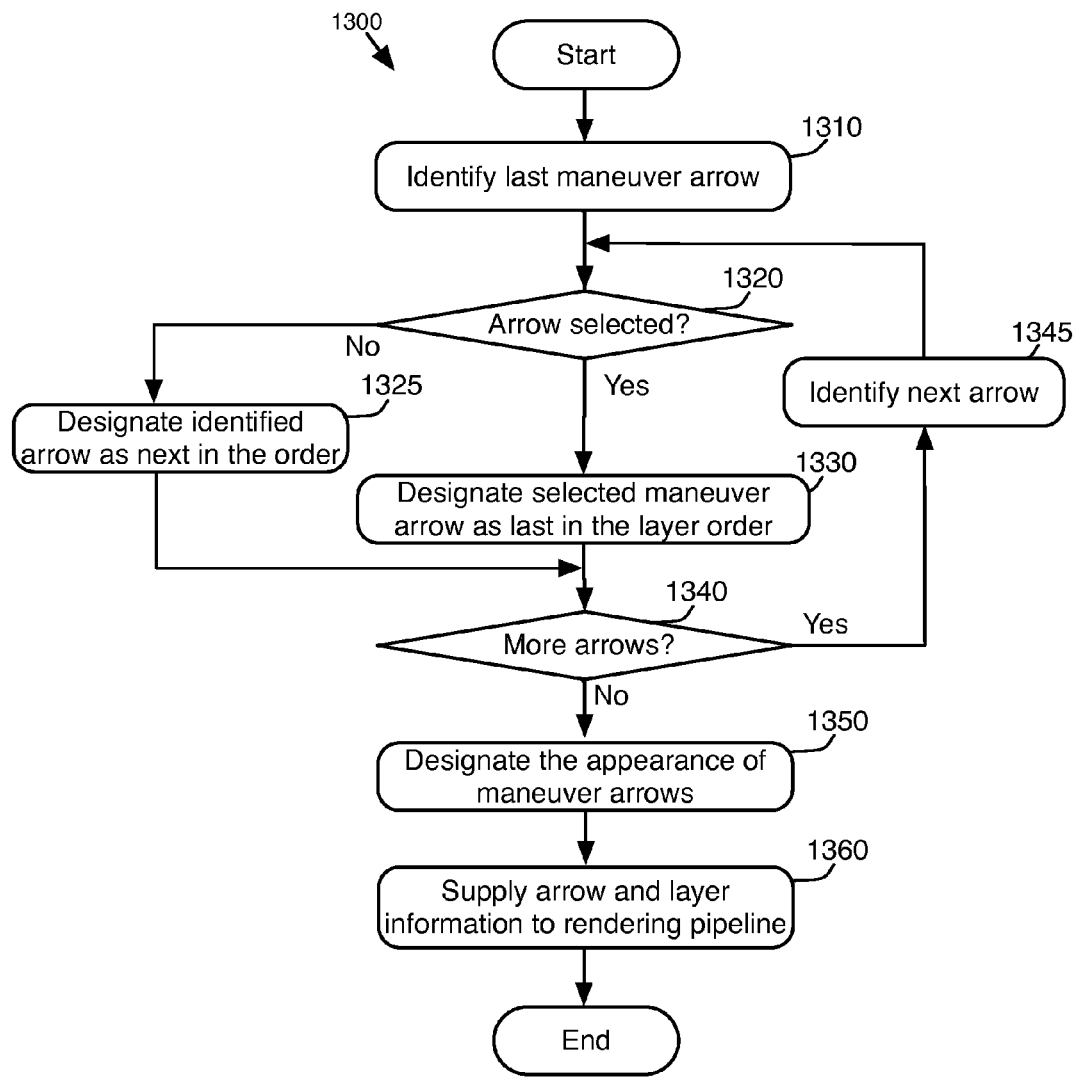
FIG. 13 conceptually illustrates a process for generating the layering order for the maneuver arrows.

As shown in FIG. 13, the process identifies (at 1310) the last maneuver arrow in a sequence of maneuver arrows. The sequence of maneuvers in some embodiments includes all of the maneuver arrows along a route. In other embodiments, rather than all of the maneuver arrows, the sequence of maneuvers only includes the maneuver arrows that are currently in a viewing area of the mapping application. In some embodiments, the sequence of maneuvers is in the order of the maneuver arrows from the route start location to the route end location. In this case, the last maneuver arrow is for the last maneuver that is performed to reach the end location.

The process 1300 then determines (at 1320) whether the identified arrow is currently selected. As described above, an arrow may be selected in various ways (e.g., a user selects the arrow directly, a user selects a banner that provide maneuver instructions corresponding to the maneuver arrow, the mapping application selects a maneuver arrow based on a user's current location, etc.). When the process 1300 determines (at 1320) that the identified arrow is not currently selected, the process 1300 designates (at 1325) the identified maneuver arrow as the next object in a layer order. The layer order determines how objects are rendered relative to each other. Items earlier in the layer order will be below (in a lower layer) than objects that are later in the layer order. In this example, the first maneuver arrow to be designated in the layer order will be shown below any overlapping maneuver arrows, as described above by reference to FIG. 8.

Alternatively, when the process 1300 determines (at 1320) that the identified maneuver arrow is currently selected, the process designates (at 1330) the identified maneuver arrow as the last object to layer order. By designating a currently selected maneuver arrow as the last in the layer order, the process 1300 ensures that the currently selected maneuver arrow will be rendered above any of the other maneuver arrows.

From 1325 and 1330, the process 1300 transitions to 1340, where it determines whether there are any more maneuver arrows that it has yet to examine. When the process 1300 determines (at 1340) that there are more maneuver arrows, the process 1300 identifies (at 1345) the next maneuver arrow and returns to 1320 to determine whether the arrow is currently selected and based on this determination specify its layer order at 1325 or 1330.

When the process determines (at 1340) that there are no more maneuver arrows, the process 1300 has finished designating the layer order for the sequence of maneuver arrows. The process 1300 designates (at 1350) the appearance of the maneuver arrows. This process in some embodiments designates one appearance for the maneuver arrow that is currently selected and another appearance for the other maneuver arrows in order to display the currently selected arrow differently than the other maneuver arrows. In some embodiments, the process designates different appearances for the other maneuver arrows as well. For example, as described above, a selected arrow is displayed as a white arrow while the other arrows are displayed as black arrows in some embodiments. In some embodiments, when no arrow is selected, the process designates the same appearance for all of the arrows. Differentiating a selected arrow from neighboring arrows allows a user to see the location and orientation of a selected maneuver with a quick glance at the map. To differentiate the currently selected arrow from the other arrows, the process 1300 uses a different color for the selected arrow, renders this arrow with a different shape, or uses any number of other techniques to differentiate the appearance of the selected maneuver arrow from the other arrows. The process 1300 then supplies (at 1360) the data regarding the maneuver arrows, their layers and their relative appearance to the rendering pipeline of the mapping application and then ends.

Figure 14:
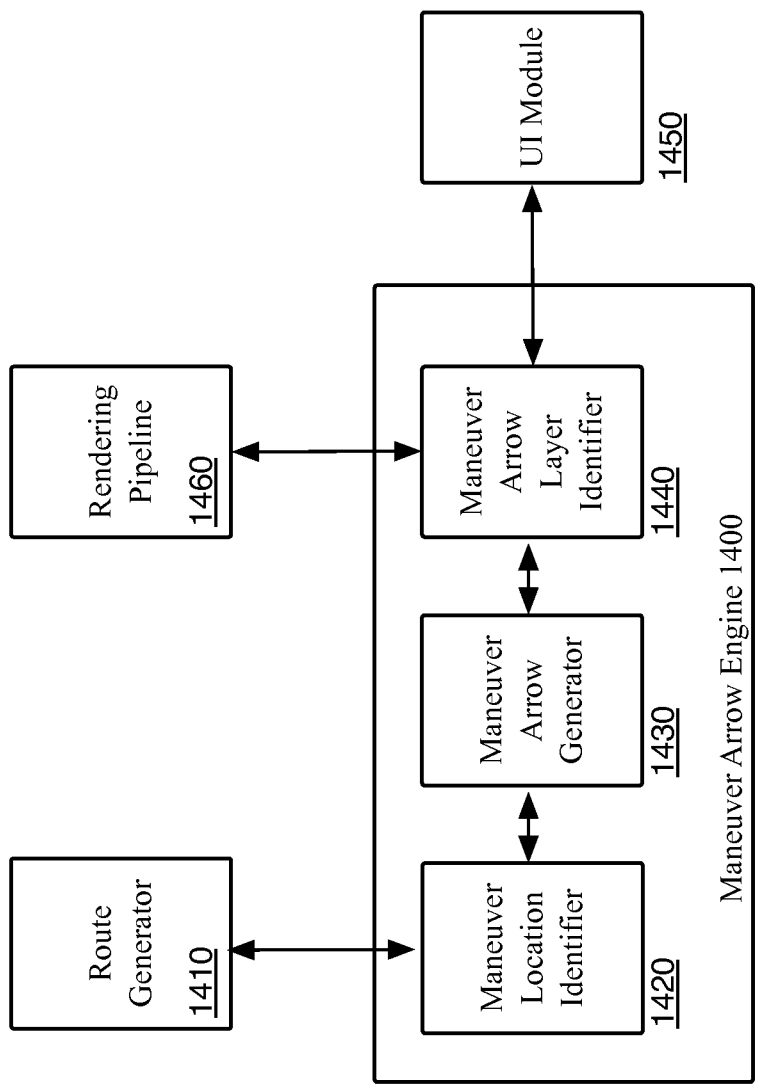
FIG. 14 conceptually illustrates a maneuver arrow engine of some embodiments.

FIG. 14 conceptually illustrates a maneuver arrow engine 1400 of some embodiments. This engine includes a maneuver location identifier 1420, a maneuver arrow generator 1430 and a maneuver arrow layer identifier 1440. As further shown, this engine interacts with the route generator 1410, the rendering pipeline 1460 and the UI module 1450. All of these modules are part of a mapping application that executes on one device (e.g., a computer, smartphone, etc.)

The route generator 1410 generates a route between two locations. In some embodiments, the route generator generates a route on its own, while in other embodiments it uses an external routing (mapping) service to generate the route. The generated route in some embodiments includes data regarding maneuvers along the route. To obtain the route from the external routing service, the route generator uses a communication channel established through a network (e.g., the Internet) between the routing service and the device that executes the mapping application. Once the route generator 1410 generates or obtains a route for display, it supplies the route to the rendering pipeline for rendering and calls the maneuver arrow engine to generate maneuver arrows along the route.

The maneuver location identifier 1420 of some embodiments uses maneuver data contained in the received route to identify the location of the maneuver arrows, while in other embodiments, the maneuver location identifier 1420 analyzes the received route to identify the location of the maneuver arrows. The maneuver location identifier 1420 then performs the operations 1120, 1130 and 1140 to specify the location of the maneuver arrows along a simplified version of the route. In some embodiments, the simplified version of the route is also the version of the route that is rendered by the rendering pipeline for display.

Once the maneuver locations are specified, the maneuver arrow generator 1430 specifies the definition of each maneuver arrow in terms of the maneuver locations specified by the identifier 1420. It then supplies the maneuver arrow definitions to the maneuver arrow layer identifier 1440. In some embodiments, the layer identifier 1440 performs the process 1300 of FIG. 13 to specify the layers for the arrows and the designated appearance of the arrows based on their associated layer order. In some embodiments, the identifier 1440 does not specify the appearance of the arrows, but rather leaves it to a mesh builder inside of the rendering pipeline to differentiate the appearance of the arrows based on the specified layer order and based on pre-specified rules.

The identifier 1440 also interacts with the UI module 1450 of the mapping application to receive data regarding user interaction with the maneuver arrows. Specifically, when the user selects an arrow directly, or indirectly by selecting a maneuver banner associated with an arrow, the UI module notifies the identifier of the newly selected arrow so that the identifier can change the layer order of the newly selected arrow as well as the layer order of the previously selected arrow. Similarly, when the mapping application automatically changes the selected arrow (without user intervention), the UI module notifies the identifier of the newly selected arrow so that it can again change the layer order data.

The identifier 1440 supplies the generated maneuver arrows, their layers and their relative appearance to the rendering pipeline of the mapping application. The rendering pipeline then uses this data to render the maneuver arrows in the map display. In rendering these arrows, the rendering pipeline uses the layering model illustrated in FIG. 10 to render the maneuver arrows above roads, routes, and traffic segments.

Figure 15:
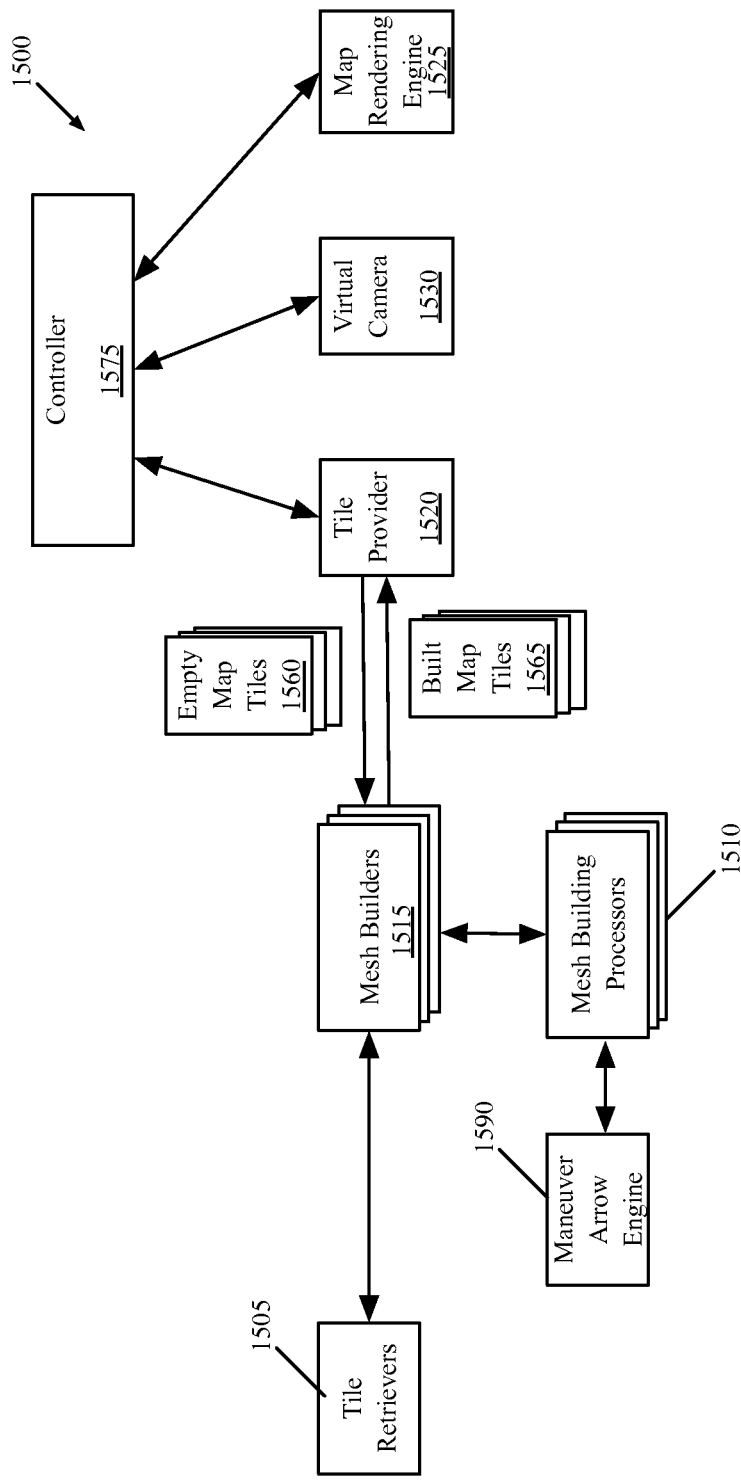
FIG. 15 conceptually illustrates a rendering pipeline of the mapping application of some embodiments in order to render a map with maneuver arrows for display on a device.

FIG. 15 conceptually illustrates a rendering pipeline 1500 of the mapping application of some embodiments in order to render a map with maneuver arrows for display on a device (e.g., on the display of the device). As illustrated, the processing pipeline 1500 includes a set of tile retrievers 1505, a set of mesh builders 1515, a tile provider 1520, a virtual camera 1530, a map rendering engine 1525, and a maneuver arrow engine 1590.

The tile retrievers 1505 perform various processes to retrieve map tiles in some embodiments, according to requests for the map tiles from the mesh builders 1515. The mesh builders 1515, as are described below, identify existing map tiles (that are stored on a mapping service server or in a cache on the device performing the processing pipeline 1500) needed to build their respective meshes. The tile retrievers 1505 receive the requests for the map tiles, determine the best location from which to retrieve the map tiles (e.g., from the mapping service, from a cache on the device, etc.) and decompress the map tiles if required.

The mesh builders 1515 (also referred to as tile sources) of some embodiments are instantiated by the tile provider 1520 in order to build different layers of virtual map tiles. Depending on the type of map being displayed by the mapping application, the tile provider 1520 may instantiate a different number and different types of mesh builders 1515. For a 2D or 3D rendered vector map (i.e., a non-satellite image map), some embodiments instantiate separate mesh builders 1515 to build meshes for landcover polygon data (e.g., parks, bodies of water, etc.), roads, place of interest markers, point labels (e.g., labels for parks, etc.), road labels (e.g., road labels in map browsing mode and road signs in navigation mode), traffic (if displaying traffic), buildings, raster data (for certain objects at certain zoom levels), maneuver arrows, as well as other layers of data to incorporate into the map.

The mesh builders 1515 of some embodiments, receive "empty" virtual map tiles 1560 from the tile provider 1520 and return "built" virtual map tiles 1565 to the tile provider 1520. That is, the tile provider 1520 sends to each of the mesh builders 1515 one or more virtual map tiles 1560. Each of the virtual map tiles 1560 indicates an area for which a mesh should be drawn. Upon receiving such a virtual map tile 1560, a mesh builder 1515 identifies the map tiles needed from the mapping service, and sends its list to the tile retrievers 1505.

Upon receiving the tiles back from tile retrievers 1505, a mesh builder uses vector data stored in the tiles to build a polygon mesh for the area described by the virtual map tile. In some embodiments, a separate mesh is built for roads, routes, traffic, and maneuver arrows. In some embodiments, each mesh builder 1515 can use one or more different mesh building processors 1510 to build the mesh. These functions may include a mesh generator, a triangulator, a shadow generator, and/or a texture decoder. In some embodiments, these functions (and additional mesh building functions) are available to each mesh builder, with different mesh builders 1515 using different functions.

In some embodiments, the maneuver arrow engine 1590 provides data regarding the maneuver arrows, their layers and their appearance to one or more mesh building processors that then use this data to generate the graphic description of the maneuver arrows in a maneuver arrow mesh created by a maneuver arrow mesh builder. The maneuver arrow engine in some embodiments is the maneuver arrow engine 1400 of FIG. 14.

After building its mesh, each mesh builder 1515 returns its virtual map tiles 1565 to the tile provider 1520 with its layer of the mesh filled in. The tile provider 1520 receives from the controller 1575 a particular view (i.e., a volume, or viewing frustrum) that represents the map view to be displayed (i.e., the volume visible from the virtual camera 1530). The tile provider performs any culling (e.g., identifying the surface area to be displayed in the virtual map tile), then sends these virtual map tiles to the mesh builders 1515.

The tile provider 1520 then receives the built virtual map tiles from the mesh builders and, in some embodiments, performs culling on the built mesh using the particular view from the virtual camera (e.g., removing surface area too far away, removing objects that will be entirely behind other objects, etc.). In some embodiments, the tile provider 1520 receives the built virtual map tiles from the different mesh builders at different times (e.g., due to different processing times to complete more and less complicated meshes, different time elapsed before receiving the necessary map tiles from the tile processor, etc.). Once all of the layers of virtual map tiles have been returned, the tile provider 1520 of some embodiments puts the layers together and releases the data to the controller for rendering.

The virtual camera 1530 generates a volume or surface for the pipeline 1500 to render, and sends this information to the controller 1575. Based on a particular location and orientation from which the map will be rendered (i.e., the point in 3D space from which the user "views" the map), the virtual camera identifies a field of view to actually send to the tile provider 1520. In some embodiments, when the mapping application is rendering the 3D perspective view for navigation, the field of view of the virtual camera is determined according to an algorithm that generates a new virtual camera location and orientation at regular intervals based on the movement of the user device.

The controller 1575 is responsible for managing the tile provider 1520, virtual camera 1530, and map rendering engine 1525 in some embodiments. In some embodiments, multiple tile providers may actually be instantiated, and the controller puts together several virtual map tiles (e.g., map tiles and building tiles) to create a scene that is handed off to the map rendering engine 1525.

The map rendering engine 1525 is responsible for generating a drawing to output to a display device based on the mesh tiles (not shown) sent from the virtual camera. The map rendering engine 1525 of some embodiments has several sub-processes. In some embodiments, each different type of map element is rendered by a different sub-process, with the rendering engine 1525 handling the occlusion of different layers of objects (e.g., placing labels above or behind different buildings, generating roads on top of land cover, etc.). Examples of such rendering processes include a road rendering process, an arrow rendering process, a building rendering process, a label rendering process, a vegetation rendering process, a raster traffic rendering process, a raster road rendering process, a satellite rendering process, a polygon rendering process, a background raster rendering process, etc.

The operation of the rendering pipeline 1500 in some embodiments will now be described. Based on user input to view a particular map region at a particular zoom level, the virtual camera 1530 specifies a location and orientation from which to view the map region, and sends this viewing frustrum, or volume, to the controller 1575. The controller 1575 instantiates one or more tile providers. While one tile provider 1520 is shown in this figure, some embodiments allow the instantiation of multiple tile providers at once. For instance, some embodiments instantiate separate tile providers for building tiles and for map tiles.

The tile provider 1520 performs any culling necessary to generate an empty virtual map tile identifying regions of the map region for which a mesh needs to be built, and sends the empty virtual map tile to the mesh builders 1515, which are instantiated for the different layers of the drawn map (e.g., roads, land cover, POI labels, maneuver arrows, etc.). The mesh builders 1515 use a manifest received from the mapping service that identifies the different tiles available on the mapping service server (i.e., as nodes of a quadtree). The mesh builders 1515 request specific map tiles from the tile retrievers 1505, which return the requested map tiles to the mesh builders 1515.

Once a particular mesh builder 1515 has received its map tiles, it begins using the vector data stored in the map tiles to build the mesh for the virtual map tiles sent from the tile provider 1520. In some embodiments, a mesh builder 1515 for the maneuver arrows uses the maneuver arrow order data from the maneuver arrow engine 1590 to build a mesh for the arrows. After building the mesh for its map layer, the mesh builder 1515 sends the built virtual map tile back to the tile provider 1520. The tile provider 1520 waits until it has received all of the virtual map tiles from the various mesh builders 1515, then layers these together and sends the completed virtual map tile to the controller 1575. The controller stitches together the returned tiles from all of its tile providers (e.g., a map virtual map tile and a building virtual map tile) and sends this scene to the rendering engine 1525. The map rendering engine 1525 uses the information in the map tiles to draw the scene for display.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger application while remaining distinct software inventions. In some embodiments, multiple software inventions can also be implemented as separate applications. Finally, any combination of separate applications that together implement a software invention described here is within the scope of the invention. In some embodiments, the software applications, when installed to operate on one or more electronic systems, define one or more specific machine implementations that execute and perform the operations of the software applications.

Figure 16:
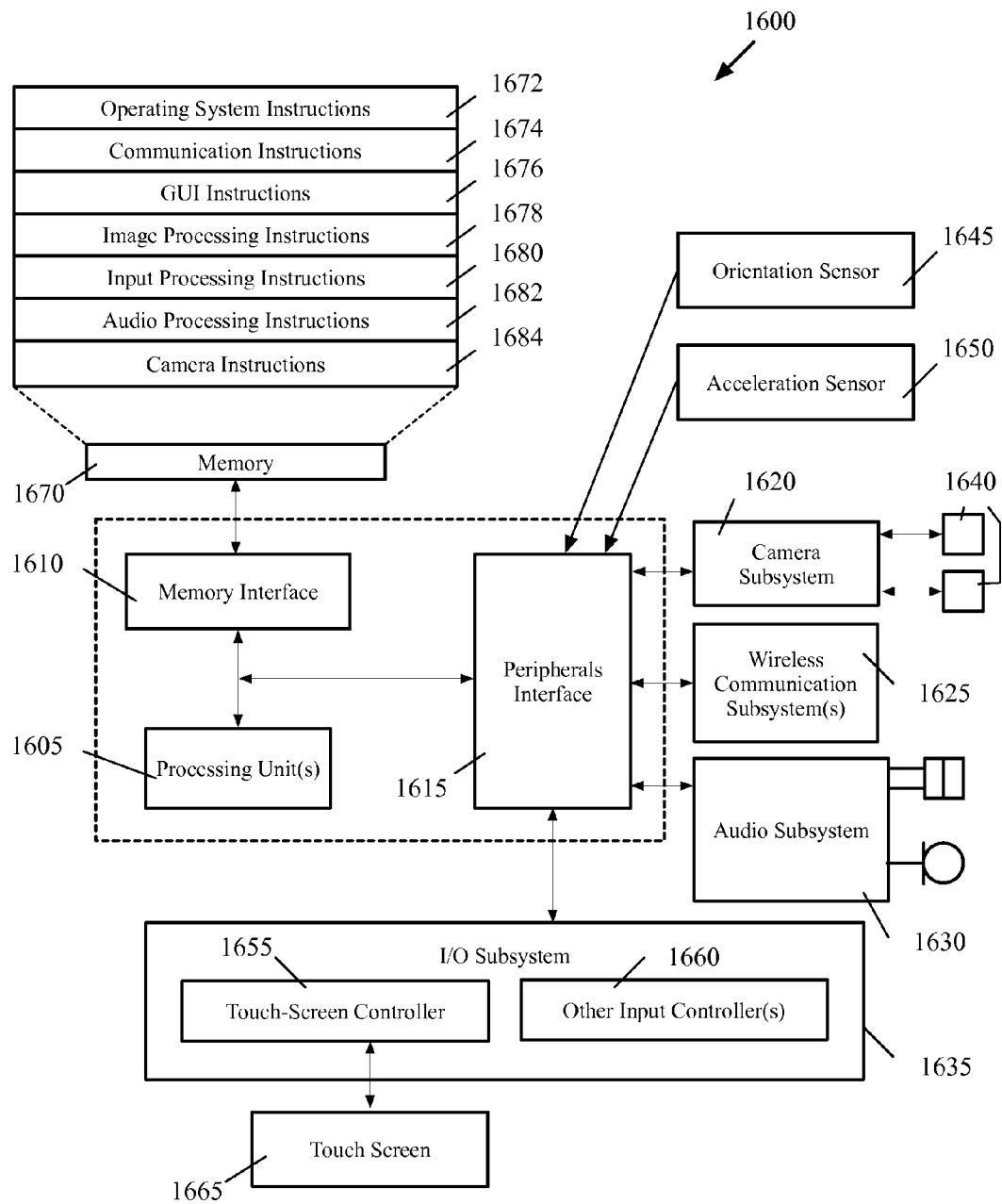
FIG. 16 is an example of an architecture of a mobile computing device.

The mapping and navigation applications of some embodiments operate on mobile devices, such as smart phones (e.g., iPhones®) and tablets (e.g., iPads®). FIG. 16 is an example of an architecture 1600 of such a mobile computing device. Examples of mobile computing devices include smartphones, tablets, laptops, etc. As shown, the mobile computing device 1600 includes one or more processing units 1605, a memory interface 1610 and a peripherals interface 1615.

The peripherals interface 1615 is coupled to various sensors and subsystems, including a camera subsystem 1620, a wireless communication subsystem(s) 1625, an audio subsystem 1630, an I/O subsystem 1635, etc. The peripherals interface 1615 enables communication between the processing units 1605 and various peripherals. For example, an orientation sensor 1645 (e.g., a gyroscope) and an acceleration sensor 1650 (e.g., an accelerometer) is coupled to the peripherals interface 1615 to facilitate orientation and acceleration functions.

The camera subsystem 1620 is coupled to one or more optical sensors 1640 (e.g., a charged coupled device (CCD) optical sensor, a complementary metal-oxide-semiconductor (CMOS) optical sensor, etc.). The camera subsystem 1620 coupled with the optical sensors 1640 facilitates camera functions, such as image and/or video data capturing. The wireless communication subsystem 1625 serves to facilitate communication functions. In some embodiments, the wireless communication subsystem 1625 includes radio frequency receivers and transmitters, and optical receivers and transmitters (not shown in FIG. 16). These receivers and transmitters of some embodiments are implemented to operate over one or more communication networks such as a GSM network, a Wi-Fi network, a Bluetooth network, etc. The audio subsystem 1630 is coupled to a speaker to output audio (e.g., to output voice navigation instructions). Additionally, the audio subsystem 1630 is coupled to a microphone to facilitate voice-enabled functions, such as voice recognition (e.g., for searching), digital recording, etc.

The I/O subsystem 1635 involves the transfer between input/output peripheral devices, such as a display, a touch screen, etc., and the data bus of the processing units 1605 through the peripherals interface 1615. The I/O subsystem 1635 includes a touch-screen controller 1655 and other input controllers 1660 to facilitate the transfer between input/output peripheral devices and the data bus of the processing units 1605. As shown, the touch-screen controller 1655 is coupled to a touch screen 1665. The touch-screen controller 1655 detects contact and movement on the touch screen 1665 using any of multiple touch sensitivity technologies.

The other input controllers 1660 are coupled to other input/control devices, such as one or more buttons. Some embodiments include a near-touch sensitive screen and a corresponding controller that can detect near-touch interactions instead of or in addition to touch interactions.

The memory interface 1610 is coupled to memory 1670. In some embodiments, the memory 1670 includes volatile memory (e.g., high-speed random access memory), non-volatile memory (e.g., flash memory), a combination of volatile and non-volatile memory, and/or any other type of memory. As illustrated in FIG. 16, the memory 1670 stores an operating system (OS) 1672. The OS 1672 includes instructions for handling basic system services and for performing hardware dependent tasks.

The memory 1670 also includes communication instructions 1674 to facilitate communicating with one or more additional devices; graphical user interface instructions 1676 to facilitate graphic user interface processing; image processing instructions 1678 to facilitate image-related processing and functions; input processing instructions 1680 to facilitate input-related (e.g., touch input) processes and functions; audio processing instructions 1682 to facilitate audio-related processes and functions; and camera instructions 1684 to facilitate camera-related processes and functions. The instructions described above are merely exemplary and the memory 1670 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software applications or modules. Various functions of the mobile computing device can be implemented in hardware and/or in software, including in one or more signal processing and/or application specific integrated circuits.

While the components illustrated in FIG. 16 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 16 may be split into two or more integrated circuits.

Figure 17:
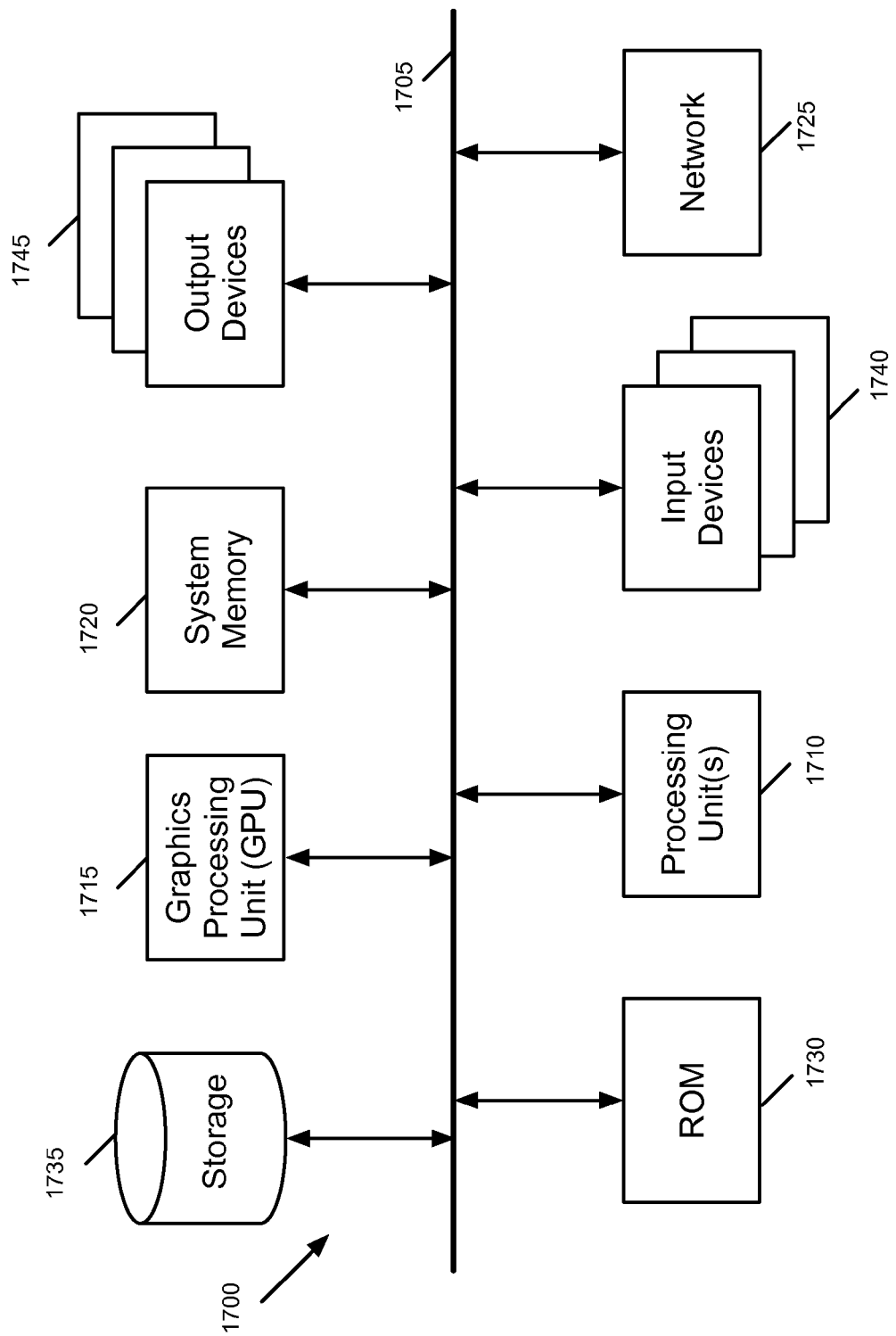
FIG. 17 conceptually illustrates an electronic system with which some embodiments of the invention are implemented.

FIG. 17 conceptually illustrates another example of an electronic system 1700 with which some embodiments of the invention are implemented. The electronic system 1700 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1700 includes a bus 1705, processing unit(s) 1710, a graphics processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the GPU 1715, the system memory 1720, and the permanent storage device 1735.

From these various memory units, the processing unit(s) 1710 retrieves instructions to execute and data to process in order to execute the processes of the invention. The processing unit(s) may be a single processor or a multi-core processor in different embodiments. Some instructions are passed to and executed by the GPU 1715. The GPU 1715 can offload various computations or complement the image processing provided by the processing unit(s) 1710. In some embodiments, such functionality can be provided using CoreImage's kernel shading language.

The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive, integrated flash memory) as the permanent storage device 1735.

Other embodiments use a removable storage device (such as a floppy disk, flash memory device, etc., and its corresponding drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor needs at runtime. In some embodiments, the invention's processes are stored in the system memory 1720, the permanent storage device 1735, and/or the read-only memory 1730. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer application instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer application that is executable by at least one processing unit and includes sets of instructions for performing various operations. Examples of computer applications or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 18:
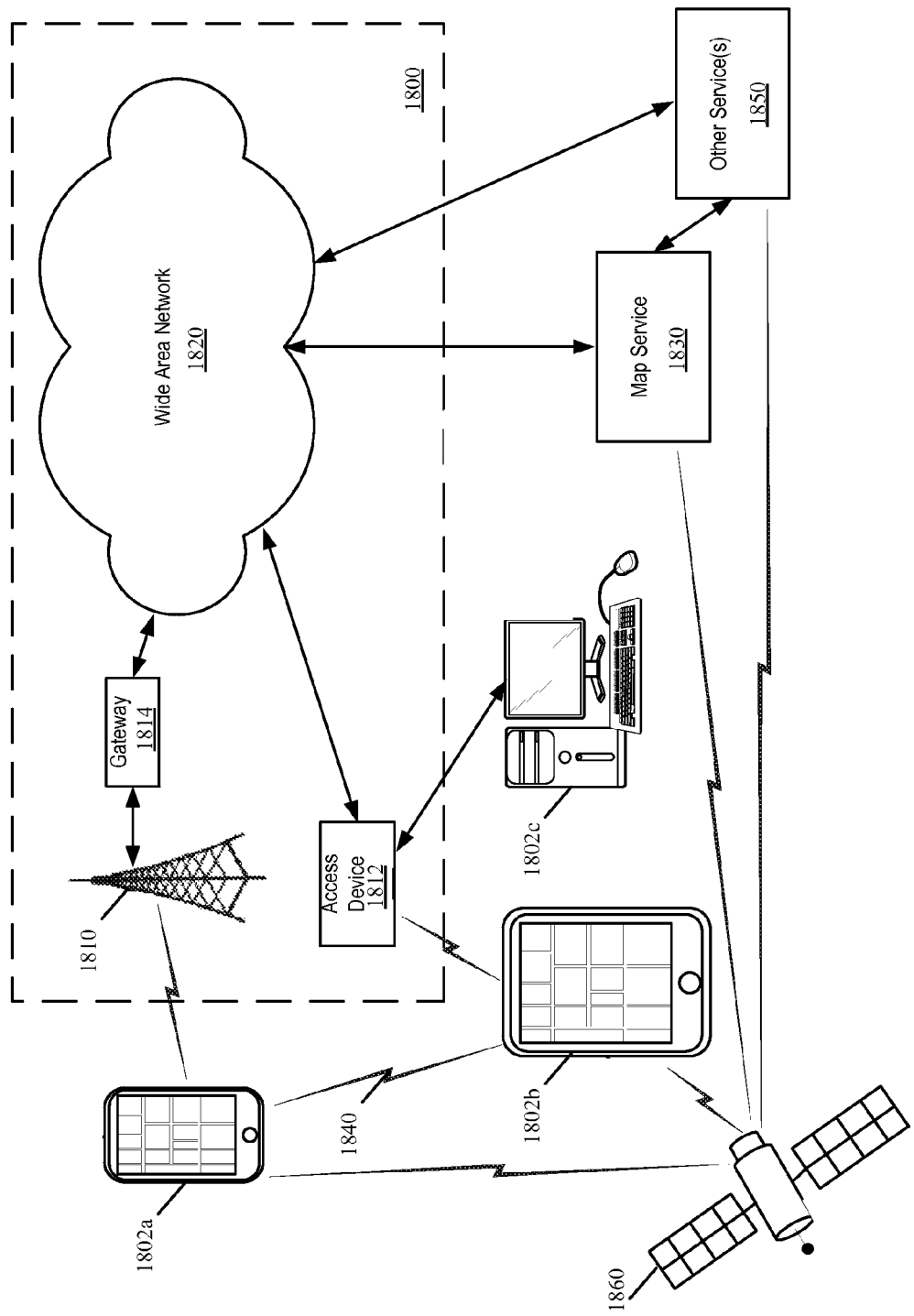
FIG. 18 illustrates a map service operating environment according to some embodiments.

Various embodiments may operate within a map service operating environment. FIG. 18 illustrates a map service operating environment according to some embodiments. A map service 1830 (also referred to as mapping service) may provide map services for one or more client devices 1802a-1802c in communication with the map service 1830 through various communication methods and protocols. A map service 1830 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device is currently located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 1802a-1802c may utilize these map services by obtaining map service data. Client devices 1802a-1802c may implement various techniques to process map service data. Client devices 1802a-1802c may then provide map services to various entities, including, but not limited to, users, internal software or hardware modules, and/or other systems or devices external to the client devices 1802a-1802c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be for a specific maps or portions of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, requests for current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and, as such, the above examples are not intended to be limiting.

Various embodiments of client devices (e.g., client devices 1802a-1802c) are implemented on different portable-multifunction device types. Client devices 1802a-1802c utilize map service 1830 through various communication methods and protocols. In some embodiments, client devices 1802a-1802c obtain map service data from map service 1830. Client devices 1802a-1802c request or receive map service data. Client devices 1802a-1802c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. In some embodiments, the client devices allow the device to adjust the virtual camera display orientation to bias toward the route destination. Some embodiments also allow the virtual camera to navigate turns by simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet, which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 18 illustrates one possible embodiment of an operating environment 1800 for a map service 1830 and client devices 1802a-1802c. In some embodiments, devices 1802a, 1802b, and 1802c communicate over one or more wire or wireless networks 1810. For example, wireless network 1810, such as a cellular network, can communicate with a wide area network (WAN), such as the Internet, by use of gateway 1814. A gateway 1814 in some embodiments provides a packet oriented mobile data service, such as General Packet Radio Service (GPRS), or other mobile data service allowing wireless networks to transmit data to other networks, such as wide area network. Likewise, access device 1812 (e.g., IEEE 802.11g wireless access device) provides communication access to WAN 1160. Devices 1802a and 1802b can be any portable electronic or computing device capable of communicating with a map service. Device 1802c can be any non-portable electronic or computing device capable of communicating with a map service.

In some embodiments, both voice and data communications are established over wireless network 1810 and access device 1812. For instance, device 1802a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1810, gateway 1814, and WAN 1160 (e.g., using Transmission Control Protocol/Internet Protocol (TCP/IP) or User Datagram Protocol (UDP)). Likewise, in some implementations, devices 1802b and 1802c can place and receive phone calls, send and receive e-mail messages, and retrieve electronic documents over access device 1812 and WAN 1160. In various embodiments, any of the illustrated client devices may communicate with map service 1830 and/or other service(s) 1850 using a persistent connection established in accordance with one or more security protocols, such as the Secure Sockets Layer (SSL) protocol or the Transport Layer Security (TLS) protocol.

Devices 1802a and 1802b can also establish communications by other means. For example, wireless device 1802a can communicate with other wireless devices (e.g., other devices 1802b, cell phones, etc.) over the wireless network 1810. Likewise devices 1802a and 1802b can establish peer-to-peer communications 1840 (e.g., a personal area network) by use of one or more communication subsystems, such as Bluetooth® communication from Bluetooth Special Interest Group, Inc. of Kirkland, Wash. Device 1802c can also establish peer to peer communications with devices 1802a or 1802b (not shown). Other communication protocols and topologies can also be implemented. Devices 1802a and 1802b may also receive Global Positioning Satellite (GPS) signals from GPS satellites 1860.

Devices 1802a, 1802b, and 1802c can communicate with map service 1830 over one or more wired and/or wireless networks, 1812 or 1810. For instance, map service 1830 can provide map service data to rendering devices 1802a, 1802b, and 1802c. Map service 1830 may also communicate with other services 1850 to obtain data to implement map services. Map service 1830 and other services 1850 may also receive GPS signals from GPS satellites 1860.

In various embodiments, map service 1830 and/or other service(s) 1850 are configured to process search requests from any of the client devices. Search requests may include but are not limited to queries for businesses, addresses, residential locations, points of interest, or some combination thereof. Map service 1830 and/or other service(s) 1850 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1830 and/or other service(s) 1850 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1830 and/or other service(s) 1850, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1830 and/or other service(s) 1850 provide one or more feedback mechanisms to receive feedback from client devices 1802a-1602c. For instance, client devices may provide feedback on search results to map service 1830 and/or other service(s) 1850 (e.g., feedback specifying ratings, reviews, temporary or permanent business closures, errors etc.); this feedback may be used to update information about points of interest in order to provide more accurate or more up-to-date search results in the future. In some embodiments, map service 1830 and/or other service(s) 1850 may provide testing information to the client device (e.g., an A/B test) to determine which search results are best. For instance, at random intervals, the client device may receive and present two search results to a user and allow the user to indicate the best result. The client device may report the test results to map service 1830 and/or other service(s) 1850 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, in several embodiments described above, the maneuver arrows start before a maneuver and end after a maneuver so that when two maneuvers are far apart, the arrows do not overlap. However, rather than beginning maneuver arrows immediately before a maneuver, the mapping application of other embodiments might generate different kinds of maneuver arrows. For instance, in some embodiments, the application provides a continuous series of arrows along a route, so that the beginning of a maneuver arrow extends to reach the end of a preceding maneuver arrow. In view of the foregoing, one of ordinary skill in the art would understand that the invention is not to be limited by the foregoing illustrative details, but rather is to be defined by the appended claims.

What is claimed is:

1. A method of providing, on a device, a plurality of maneuvers for traversing a route, the method comprising:
displaying a plurality of maneuver indicators associated with the plurality of maneuvers, each maneuver indicator placed at a location of the maneuver associated with the maneuver indicator along a route displayed on a map;
displaying a plurality of maneuver user interface (UI) items, each maneuver UI item for displaying information regarding an associated maneuver of the plurality of maneuvers;
receiving, at an input interface of the device, input to transition from a first maneuver UI item associated with a first maneuver to a second maneuver UI item associated with a second maneuver; and
upon receiving the input from the input interface of the device, displaying the second maneuver UI item and selecting a maneuver indicator associated with the second maneuver.

2. The method of claim 1, wherein a single maneuver UI item is displayed at a time and the first maneuver UI item is the displayed maneuver UI item, wherein receiving the input comprises detecting a swiping input across the first maneuver UI item to transition to the second maneuver UI item.

3. The method of claim 2, wherein the displayed information comprises a text instruction and a graphical representation of the associated maneuver.

4. The method of claim 1, wherein selecting a maneuver indicator comprises displaying the selected maneuver indicator with a different appearance from the other displayed maneuver indicators.

5. The method of claim 1, wherein prior to receiving the input, a first maneuver indicator associated with the first maneuver is selected, wherein selecting the second maneuver indicator associated with the second maneuver comprises animating a transition between the selection of the first maneuver indicator and the selection of the second maneuver indicator.

6. The method of claim 1, wherein the maneuver indicators are arrows that begin before a maneuver and end after the maneuver along the route on the map.

7. The method of claim 1, wherein the UI item is a banner item and the displayed information comprises at least one of a text instruction and a graphical representation of the associated maneuver.

8. A non-transitory machine readable medium storing a program which when executed by a set of processing units of a device provides a plurality of maneuvers for traversing a route, the program comprising sets of instructions for:
displaying a plurality of maneuver indicators associated with the plurality of maneuvers, each maneuver indicator placed at a location of the maneuver associated with the maneuver indicator along a route displayed on a map;
displaying a plurality of maneuver user interface (UI) items, each maneuver UI item for displaying information regarding an associated maneuver of the plurality of maneuvers;
receiving input to transition from a first maneuver UI item associated with a first maneuver to a second maneuver UI item associated with a second maneuver; and
upon receiving the input, displaying the second maneuver UI item and selecting a maneuver indicator associated with the second maneuver.

9. The non-transitory machine readable medium of claim 8, wherein a single maneuver UI item is displayed at a time and the first maneuver UI item is the displayed maneuver UI item, wherein the set of instructions for receiving the input comprises a set of instructions for detecting a swiping input across the first maneuver UI item to transition to the second maneuver UI item.

10. The non-transitory machine readable medium of claim 8, wherein the set of instructions for selecting a maneuver indicator comprises a set of instructions for displaying the selected maneuver indicator with a different appearance from the other displayed maneuver indicators.

11. The non-transitory machine readable medium of claim 8, wherein prior to receiving the input, a first maneuver indicator associated with the first maneuver is selected, wherein the set of instructions for selecting the second maneuver indicator associated with the second maneuver comprises a set of instructions for animating a transition between the selection of the first maneuver indicator and the selection of the second maneuver indicator.

12. The non-transitory machine readable medium of claim 8, wherein the maneuver indicators are arrows that begin before a maneuver and end after the maneuver along the route on the map.

13. The non-transitory machine readable medium of claim 8, wherein the UI item is a banner item and the displayed information comprises at least one of a text instruction and a graphical representation of the associated maneuver.

14. The non-transitory machine readable medium of claim 8, wherein the displayed information comprises a text instruction and a graphical representation of the associated maneuver.

15. A device that provides a plurality of maneuvers for traversing a route, the device comprising:
 a set of processing units;
 a display area; and
 a non-transitory machine readable medium storing a program which when executed by the set of processing units, the program comprising sets of instructions for:
  displaying a plurality of maneuver indicators associated with the plurality of maneuvers, each maneuver indicator placed at a location of the maneuver associated with the maneuver indicator along a route displayed on a map of the display area;
  displaying a plurality of banners, each banner for displaying information regarding an associated maneuver of the plurality of maneuvers, wherein the displayed information comprises at least one of a text instruction and a graphical representation of the associated maneuver;
  receiving input to transition from a first banner associated with a first maneuver to a second banner associated with a second maneuver; and
  upon receiving the input, displaying the second banner and selecting a maneuver indicator associated with the second maneuver.

16. The device of claim 15, wherein a single banner is displayed at a time and the first banner is the displayed banner, wherein the set of instructions for receiving the input comprises a set of instructions for detecting a swiping input across the first banner to transition to the second banner.

17. The device of claim 15, wherein the set of instructions for selecting a maneuver indicator comprises a set of instructions for displaying the selected maneuver indicator with a different appearance from the other displayed maneuver indicators.

18. The device of claim 15, wherein prior to receiving the input, a first maneuver indicator associated with the first maneuver is selected, wherein the set of instructions for selecting the second maneuver indicator associated with the second maneuver comprises a set of instructions for animating a transition between the selection of the first maneuver indicator and the selection of the second maneuver indicator.

19. The device of claim 15, wherein the maneuver indicators are arrows that begin before a maneuver and end after the maneuver along the route on the map.

20. The device of claim 15, wherein the displayed information comprises a text instruction and a graphical representation of the associated maneuver.

* * * * *